(12) United States Patent
Gronvall et al.

(10) Patent No.: US 7,512,304 B2
(45) Date of Patent: Mar. 31, 2009

(54) DROP TERMINAL WITH ANCHOR BLOCK FOR RETAINING A STUB CABLE

(75) Inventors: Erik Gronvall, Richfield, MN (US); Paula Rudenick, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/728,043

(22) Filed: Mar. 23, 2007

(65) Prior Publication Data

US 2008/0232743 A1 Sep. 25, 2008

(51) Int. Cl.
*G02B 6/00* (2006.01)
(52) U.S. Cl. .................. 385/135; 385/134; 385/136; 385/137; 385/139
(58) Field of Classification Search .................. None
See application file for complete search history.

(56) References Cited

U.S. PATENT DOCUMENTS

| | | | |
|---|---|---|---|
| 4,478,486 A | 10/1984 | Fentress et al. |
| 4,648,168 A | 3/1987 | Nolf et al. |
| 4,685,764 A | 8/1987 | Hoffer et al. |
| 4,717,231 A | 1/1988 | Dewez et al. |
| 4,744,622 A | 5/1988 | Cherry et al. |
| 4,761,052 A | 8/1988 | Buekers et al. |
| 4,805,979 A | 2/1989 | Bossard et al. |
| 4,908,482 A | 3/1990 | Shimirak et al. |
| 4,913,522 A | 4/1990 | Noff et al. |
| 5,029,958 A | 7/1991 | Hodge et al. |
| 5,046,811 A | 9/1991 | Jung et al. |
| 5,048,916 A | 9/1991 | Caron |
| 5,097,529 A | 3/1992 | Cobb et al. |
| 5,097,530 A | 3/1992 | Holt et al. |
| 5,122,069 A | 6/1992 | Brownlie et al. |

(Continued)

FOREIGN PATENT DOCUMENTS

EP 0 511 147 A1 10/1992

(Continued)

OTHER PUBLICATIONS

ADC Telecommunications; FL2000 Products; 6 pages; Nov. 1996.

(Continued)

*Primary Examiner*—Sung H Pak
*Assistant Examiner*—Chad H Smith
(74) *Attorney, Agent, or Firm*—Merchant & Gould, P.C.

(57) ABSTRACT

The drop terminal includes a plurality of fiber optic adapters having outer connector ports that are accessible from outside the drop terminal. The drop terminal receives a fiber optic cable having a plurality of optical fibers. Fiber optic connectors are positioned at the ends of the optical fibers. The fiber optic connectors are inserted into inner connector ports of the fiber optic adapters. The drop terminal also includes an anchor block for securing the fiber optic cable to a main housing of the drop terminal. The anchor block can be secured to the main housing of the drop terminal by a mechanical interlock. The drop terminal may also include a transparent interior shield or liner that retains fibers in position within the drop terminal during assembly of the drop terminal.

13 Claims, 21 Drawing Sheets

U.S. PATENT DOCUMENTS

| | | | |
|---|---|---|---|
| 5,133,038 A | 7/1992 | Zipper |
| 5,155,794 A | 10/1992 | Nolf et al. |
| 5,185,845 A | 2/1993 | Jones |
| 5,208,893 A | 5/1993 | McCall et al. |
| 5,222,183 A | 6/1993 | Daems et al. |
| 5,231,687 A | 7/1993 | Handley |
| 5,235,665 A | 8/1993 | Marchesi et al. |
| 5,249,253 A | 9/1993 | Franckx et al. |
| 5,267,122 A | 11/1993 | Glover et al. |
| 5,323,480 A | 6/1994 | Mullaney et al. |
| 5,396,575 A | 3/1995 | Hayward et al. |
| 5,446,823 A | 8/1995 | Bingham et al. |
| 5,479,533 A | 12/1995 | Tanaka |
| 5,479,553 A | 12/1995 | Daems et al. |
| 5,509,099 A | 4/1996 | Hermsen et al. |
| 5,515,472 A | 5/1996 | Mullaney et al. |
| 5,525,756 A | 6/1996 | Mullaney et al. |
| 5,535,298 A | 7/1996 | Fasnacht et al. |
| D372,897 S | 8/1996 | Curry et al. |
| 5,546,495 A | 8/1996 | Bruckner et al. |
| 5,556,060 A | 9/1996 | Bingham et al. |
| 5,566,268 A | 10/1996 | Radliff et al. |
| 5,566,269 A | 10/1996 | Eberle, Jr. et al. |
| 5,577,151 A | 11/1996 | Hoffer |
| 5,602,954 A | 2/1997 | Nolf et al. |
| 5,613,030 A | 3/1997 | Hoffer et al. |
| 5,633,973 A | 5/1997 | Vincent et al. |
| 5,640,482 A | 6/1997 | Barry et al. |
| 5,659,650 A | 8/1997 | Arnett |
| 5,661,841 A | 8/1997 | Van Noten |
| 5,689,607 A | 11/1997 | Vincent et al. |
| 5,692,299 A | 12/1997 | Daems et al. |
| 5,732,180 A | 3/1998 | Kaplan |
| 5,732,181 A * | 3/1998 | Engberg et al. ............. 385/139 |
| 5,745,633 A | 4/1998 | Giebel et al. |
| 5,754,723 A | 5/1998 | Fremgen |
| 5,758,004 A | 5/1998 | Alarcon et al. |
| 5,764,843 A | 6/1998 | Macken et al. |
| 5,764,844 A | 6/1998 | Mendes |
| 5,777,268 A | 7/1998 | Allen et al. |
| 5,781,678 A | 7/1998 | Sano et al. |
| 5,825,960 A | 10/1998 | Woodward et al. |
| 5,828,807 A | 10/1998 | Tucker et al. |
| 5,886,300 A | 3/1999 | Strickler |
| 5,892,870 A | 4/1999 | Fingler et al. |
| 5,907,653 A | 5/1999 | Burek et al. |
| 5,911,027 A | 6/1999 | Macken et al. |
| 5,917,648 A | 6/1999 | Harker |
| 5,933,563 A | 8/1999 | Schaffer et al. |
| 5,982,971 A | 11/1999 | Amirkalali |
| RE36,592 E | 2/2000 | Giebel et al. |
| 6,160,946 A | 12/2000 | Thompson et al. |
| 6,167,183 A | 12/2000 | Swain |
| 6,175,079 B1 | 1/2001 | Johnston et al. |
| 6,208,796 B1 | 3/2001 | Williams Vigliaturo |
| 6,215,939 B1 | 4/2001 | Cloud |
| 6,250,816 B1 | 6/2001 | Johnston et al. |
| 6,259,024 B1 | 7/2001 | Daoud |
| 6,263,142 B1 | 7/2001 | Mardirossian et al. |
| 6,275,639 B1 | 8/2001 | Bolt et al. |
| 6,275,640 B1 | 8/2001 | Hunsinger et al. |
| 6,292,614 B1 | 9/2001 | Smith et al. |
| 6,300,562 B1 | 10/2001 | Daoud |
| 6,363,200 B1 | 3/2002 | Thompson et al. |
| 6,396,989 B1 | 5/2002 | Johnston et al. |
| 6,424,782 B1 | 7/2002 | Ray |
| 6,439,779 B1 | 8/2002 | Hafer |
| 6,453,106 B1 | 9/2002 | Glaser et al. |
| 6,504,986 B1 | 1/2003 | Wambeke et al. |
| 6,504,987 B1 | 1/2003 | Macken et al. |
| 6,507,691 B1 | 1/2003 | Hunsinger et al. |
| 6,535,682 B1 | 3/2003 | Puetz et al. |
| 6,621,975 B2 | 9/2003 | Laporte et al. |
| 6,661,961 B1 | 12/2003 | Allen et al. |
| 6,728,451 B2 | 4/2004 | Kordahi |
| 6,760,531 B1 | 7/2004 | Solheid et al. |
| 6,763,170 B2 | 7/2004 | Kordahi et al. |
| 6,788,846 B2 | 9/2004 | Hileman et al. |
| 6,880,986 B2 | 4/2005 | Mynatt et al. |
| 6,926,449 B1 | 8/2005 | Keenum et al. |
| 7,013,074 B2 | 3/2006 | Battey et al. |
| 7,072,559 B2 | 7/2006 | Giordano et al. |
| 7,120,347 B2 | 10/2006 | Blackwell, Jr. et al. |
| 7,142,764 B2 | 11/2006 | Allen et al. |
| 7,292,763 B2 | 11/2007 | Smith et al. |
| 7,298,952 B2 | 11/2007 | Allen |
| 7,333,708 B2 | 2/2008 | Blackwell, Jr. et al. |
| 7,340,145 B2 | 3/2008 | Allen |
| 2003/0077041 A1 | 4/2003 | Belaidi et al. |
| 2003/0103750 A1 | 6/2003 | Laporte et al. |
| 2004/0028368 A1 | 2/2004 | Hileman et al. |
| 2004/0062508 A1 | 4/2004 | Blankenship et al. |
| 2004/0211774 A1 | 10/2004 | Daoud et al. |
| 2005/0094959 A1 | 5/2005 | Sibley et al. |
| 2005/0129375 A1 | 6/2005 | Elkins, II et al. |
| 2005/0145522 A1 | 7/2005 | Bloodworth et al. |
| 2005/0163448 A1 | 7/2005 | Blackwell, Jr. et al. |
| 2005/0175307 A1 | 8/2005 | Battey et al. |
| 2005/0175308 A1 | 8/2005 | Elkins, II et al. |
| 2005/0185895 A1 | 8/2005 | Keenum et al. |
| 2005/0213921 A1* | 9/2005 | Mertesdorf et al. ......... 385/135 |
| 2005/0220421 A1 | 10/2005 | Keenum et al. |
| 2005/0271344 A1 | 12/2005 | Grubish et al. |
| 2005/0281510 A1 | 12/2005 | Vo et al. |
| 2006/0093303 A1 | 5/2006 | Reagan et al. |
| 2006/0098932 A1 | 5/2006 | Battey et al. |
| 2006/0153517 A1 | 7/2006 | Reagan et al. |
| 2006/0285810 A1 | 12/2006 | Vanhentenrijk et al. |
| 2006/0285811 A1 | 12/2006 | Kowalczyk |
| 2007/0104448 A1 | 5/2007 | Allen |
| 2007/0189694 A1 | 8/2007 | Mullaney et al. |

FOREIGN PATENT DOCUMENTS

| | | |
|---|---|---|
| EP | 0 805 536 A1 | 11/1997 |
| EP | 0 844 504 A2 | 5/1998 |
| FR | 2 853 775 A1 | 10/2004 |
| WO | WO 95/07478 | 3/1995 |
| WO | WO 02/06879 A1 | 1/2002 |

OTHER PUBLICATIONS

ADC Telecommunications; Fiber Panel Products Second Edition; 16 pages; Jul. 1996.

ADC Telecommunications; Fiber Cable Management Products Third Edition; 22 pages; Jun. 1998.

ADC Telecommunications; Value-Added Module System; 8 pages; Jun. 1998.

ADC Telecommunications; FL2000™ Wall Mount Box Installation Instructions; 18 pages; ADCP-90-210 Issue 4; Jan. 1998.

ADC Telecommunications; FTUA 4- and 12-Fiber Wall Box User Manual; 14 pages; ADCP-90-249 Issue 2, Mar. 1997.

ADC Telecommunications; Wall Mount Box Dec. 24, 1936 Fiber User Manual; 16 pages; ADCP-90-149 Issue 3, Jul. 1997.

ADC Telecommunications; FL1000 Wall-Mount Box Installation and Operation Guide; 28 pages; ADCP-90-334 Issue 1, Nov. 2004.

ADC Telecommunications; FTD1 36-Fiber Wall Box User Manual; 15 pages; ADCP-90-250 Issue 1, Nov. 1996.

ADC Telecommunications; Six-Fiber In-Building Wall Box Installation Instructions; 8 pages; ADCP-90-167 Issue 3, Nov. 1997.

International Search Report and Written Opinion mailed Nov. 17, 2008.

* cited by examiner

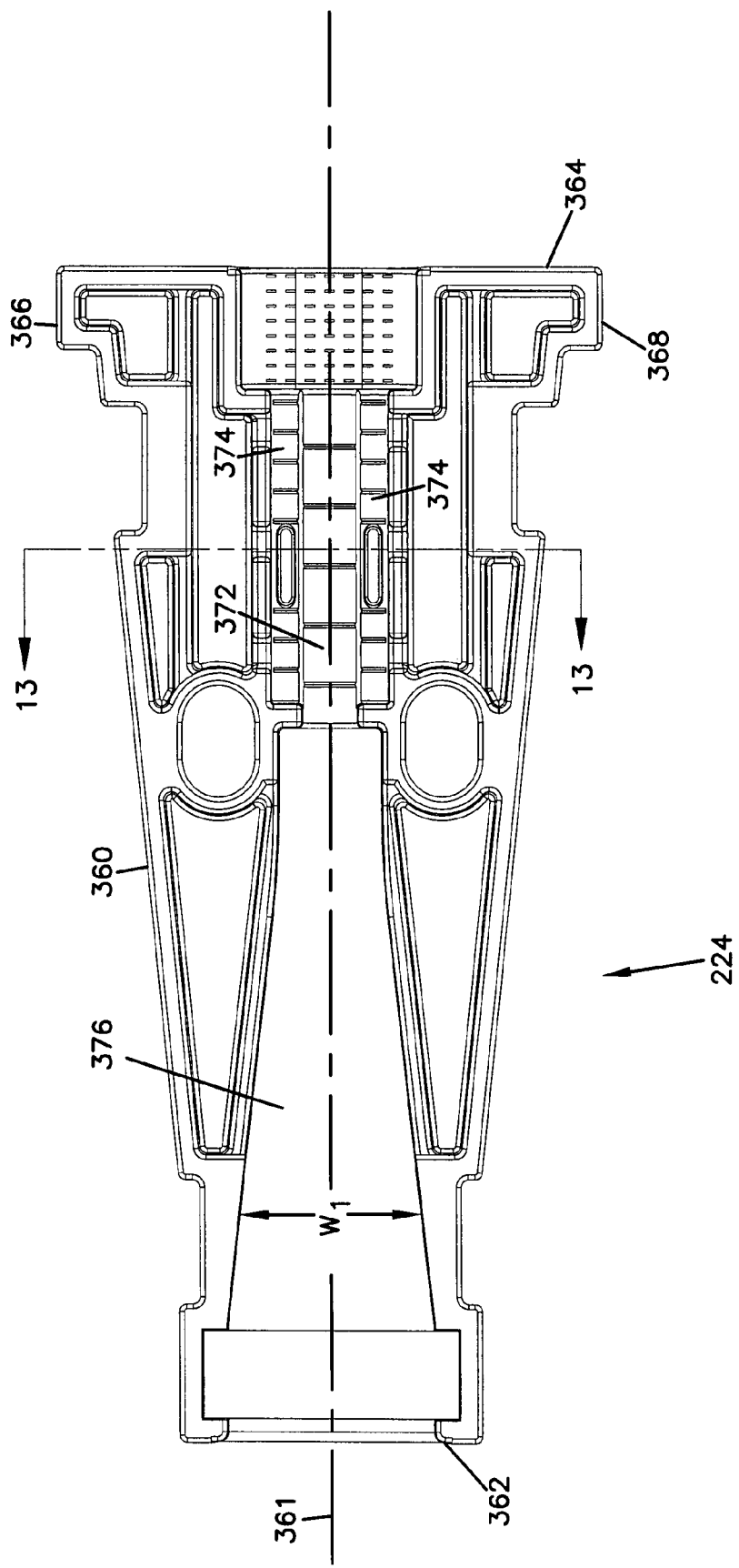

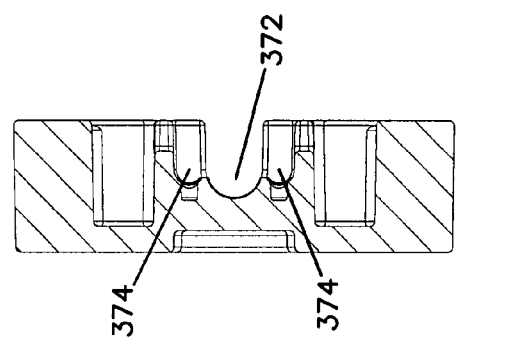
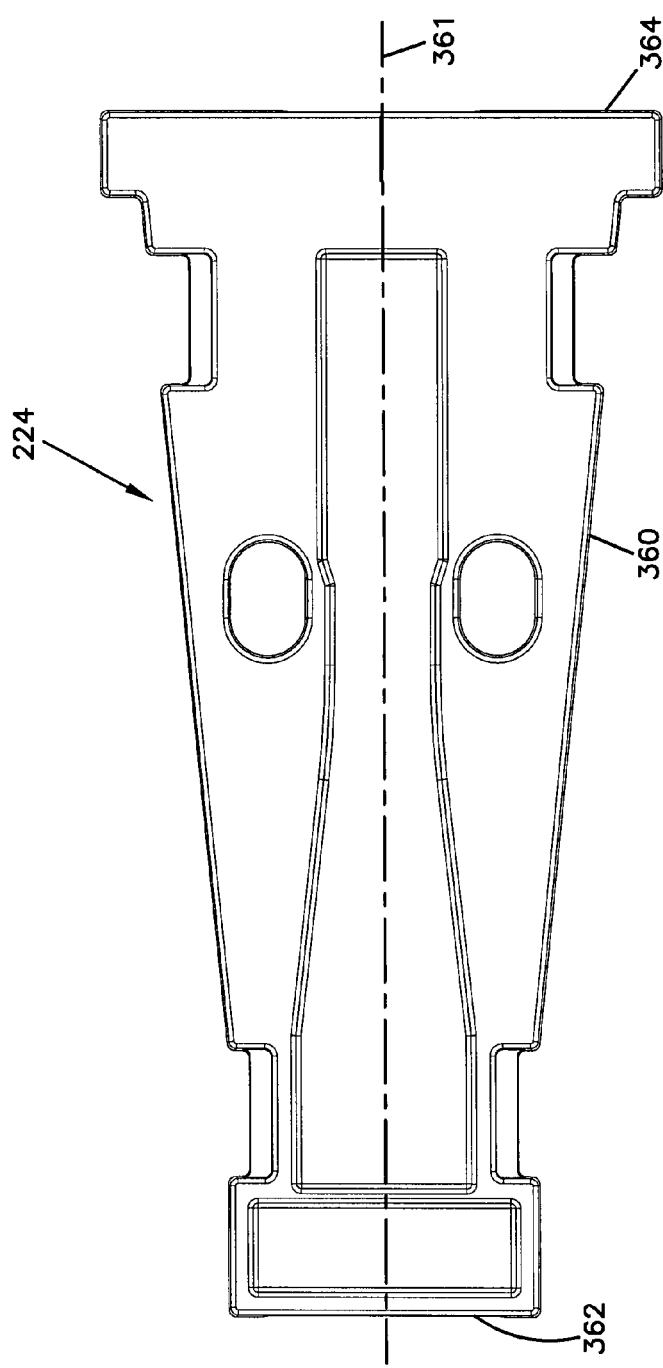

DROP TERMINAL WITH ANCHOR BLOCK FOR RETAINING A STUB CABLE

TECHNICAL FIELD

The present disclosure relates to fiber optic cable telecommunication systems. More particularly, the present disclosure relates to drop terminals used in fiber optic cable telecommunication systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

Fiber optic telecommunication technology is becoming prevalent in part because service providers want to deliver high bandwidth communication capabilities to subscribers. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN). In addition to possibly being less expensive than other network topologies, PONS may provide sufficient bandwidth to meet a majority of end users' high bandwidth communication needs into the foreseeable future.

In PONS, transmission equipment may transmit signals containing voice, data and/or video over a fiber strand to the premises. An optical fiber may be split using, for example, passive optical splitters so that signals are dispersed from one fiber (the input fiber) to multiple output fibers running to, for example, user premises from a convergence point in the network. An optical fiber routed to a user's premises may be routed via a fiber drop terminal en route to the premises. At the fiber drop terminal, signals appearing on one or more optical fibers may be routed to one or more end user premises. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground. Example fiber drop terminals are disclosed at U.S. Pat. No. 7,120,347; U.S. Patent Publication No. US 2005/0213921; and U.S. Patent Publication No. US 2006/0153517.

SUMMARY

One aspect of the present disclosure relates to a drop terminal for use in a fiber optic telecommunication network. The drop terminal includes a plurality of fiber optic adapters having outer connector ports that are accessible from outside the drop terminal. The drop terminal receives a fiber optic cable having a plurality of optical fibers. Fiber optic connectors are positioned at the ends of the optical fibers. The fiber optic connectors are inserted into inner connector ports of the fiber optic adapters. The drop terminal also includes an anchor block for securing the fiber optic cable to a main housing of the drop terminal. The anchor block can be secured to the main housing of the drop terminal by a mechanical interlock.

Another aspect of the present disclosure relates to a drop terminal having a transparent interior shield or liner that retains fibers in position within the drop terminal during assembly of the drop terminal.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 11 is a top, plan view of the cable anchor block of FIG. 10;

FIG. 12 is a bottom, plan view of the cable anchor block of FIG. 10;

FIG. 13 is a cross-sectional view taken along section line 13-13 of FIG. 11;

DETAILED DESCRIPTION

Figure 1:
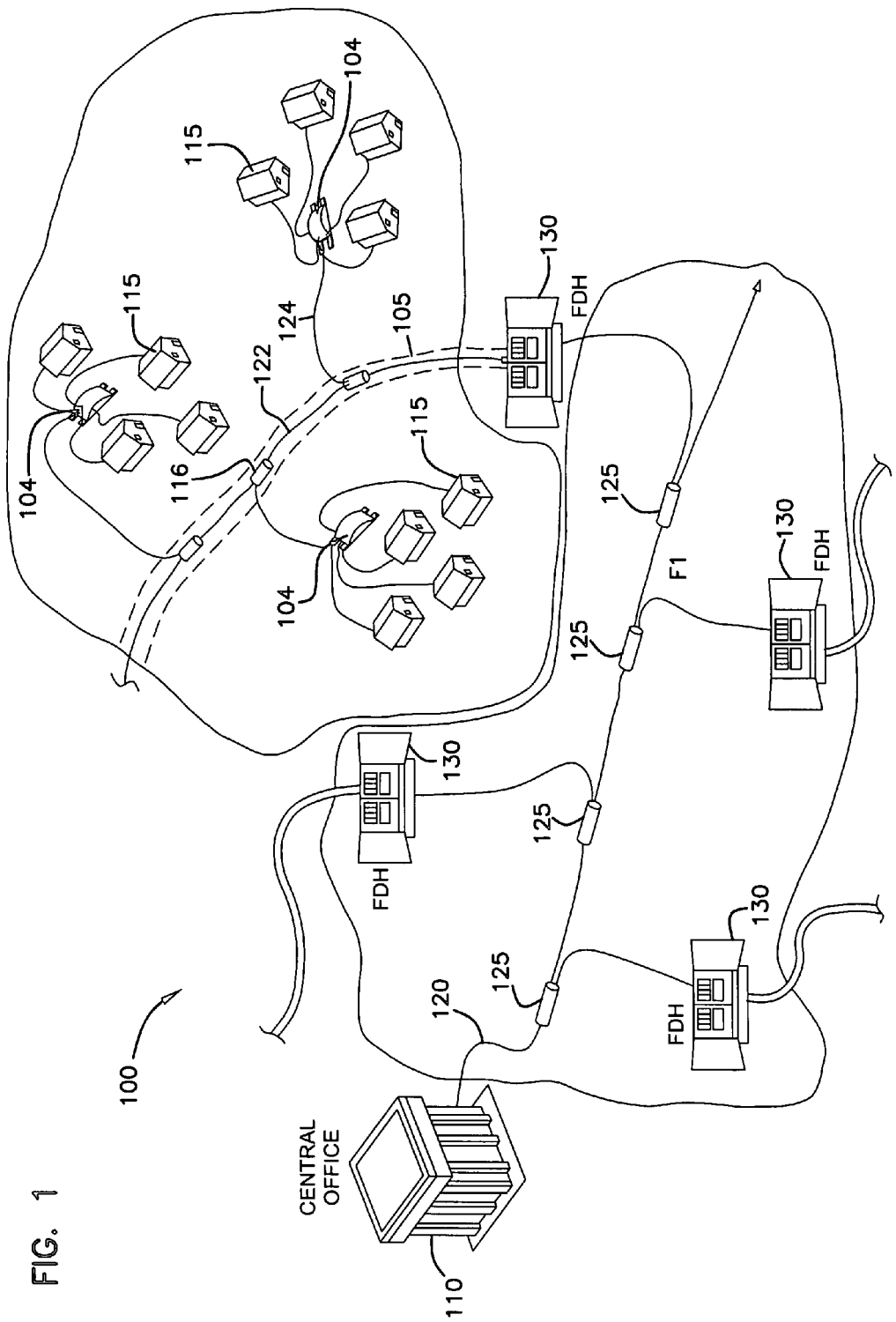
FIG. 1 shows a fiber optic network into which drop terminals in accordance with the principles of the present disclosure can be incorporated.

FIG. 1 illustrates an exemplary passive optical network 100 adapted to provide fiber-to-the-premises (FTTP). As shown in FIG. 1, the optical network 100 may include a central office 110 that connects a number of end subscriber locations 115 (also called end user locations 115 herein) in a network. The central office 110 may additionally connect to a larger network, such as the Internet (not shown) or a public switched telephone network. The various lines of the network can be aerial or housed within underground conduits (e.g., see conduit 105).

In general, the optical network 100 includes feeder cables (e.g., main cable 120) associated at one end with the central office 110 and from which distribution cables branch. The main cable 120 may have on the order of 12 to 48 fibers; however, alternative implementations may include fewer or more fibers.

The optical network 100 may include fiber distribution hubs (FDHs) 130 that receive fibers of the feeder cable 120 extending from splice locations 125 and that output one or more distribution cables 122. In general, an FDH 130 is an equipment enclosure that may include a plurality of optical splitters (e.g., 1-to-8 splitters, 1-to-16 splitters, or 1-to-32 splitters) for splitting the incoming fibers of the feeder cable 120 into a number (e.g., 216 to 432) of output distribution fibers. The distribution cable 122 extends from an FDH 130 to a number of end user locations 115.

The optical network 100 typically includes breakout locations 116 at which branch cables (e.g., drop cables, stub cables, etc.) 124 are separated out from or electrically coupled (e.g., spliced, connectorized, etc.) to distribution cables 122. Stub cables 124 are typically routed from breakout locations 116 to intermediate access locations 104 such as a pedestals, drop terminals, or hubs. Intermediate access locations 104 can provide connector interfaces located between breakout locations 116 and the end user locations 115. Drop cables are cables that typically form the last leg to an end user location 115. For example, drop cables can be routed from intermediate access locations 104 to end user locations 115. Drop cables also can be routed directly from breakout locations 116 to end user locations 115, thereby bypassing any intermediate access locations 104.

In certain embodiments, branch cables 124 can be coupled to distribution cables 122 using factory integrated terminations to provide environmentally sound and cost effective splicing protection. Factory integrated terminations may use factory integrated access (tap) points at specified points, such as at breakout locations 116, in the optical network 100 instead of manually installed splices. These factory integrated access points may be connectorized to provide a simple plug and play approach in the distribution portion of the optical network 100 when connecting end user locations 115 to the optical network 100. For example, implementations consistent with the principles of the invention may use rugged Outside Plant (OSP) connectors that can accommodate single or multi-port connectors.

FIGS. 2-6 show a drop terminal 200 having features that are examples of inventive aspects in accordance with the principles of the present disclosure. The drop terminal 200 is adapted for use within a fiber optic network. For example, the drop terminal 200 can be used at a location such as an intermediate access location 104 shown at FIG. 1.

Referring still to FIGS. 2-6, the drop terminal 200 includes a main housing 202 having a central longitudinal axis 201 that extends from a first end 204 to a second end 206 of the main housing 202. The main housing 202 includes a front piece 208 and a back piece 210 that cooperate to define an enclosed interior 209 (see FIG. 5) of the main housing 202. The front and back pieces 208, 210 are joined by fasteners 212 (e.g., bolts or other fastening elements) spaced about a periphery of the main housing 202. The front and back pieces 208, 210 are elongated along the central axis 201 so as to extend generally from the first end 204 to the second end 206 of the main housing 202. The drop terminal 200 also includes fiber optic adapters 214 mounted to the front piece 208 of the main housing 202. The fiber optic adapters 214 each include an outer port 216 (see FIGS. 2 and 16) accessible from outside the main housing 202 and an inner port 218 (see FIGS. 6 and 16) accessible from within the main housing 202. The second end 206 of the main housing 202 defines a cable port 220 for allowing a fiber optic cable 222 to enter/exit the interior 209 of the main housing 202.

Figure 5:
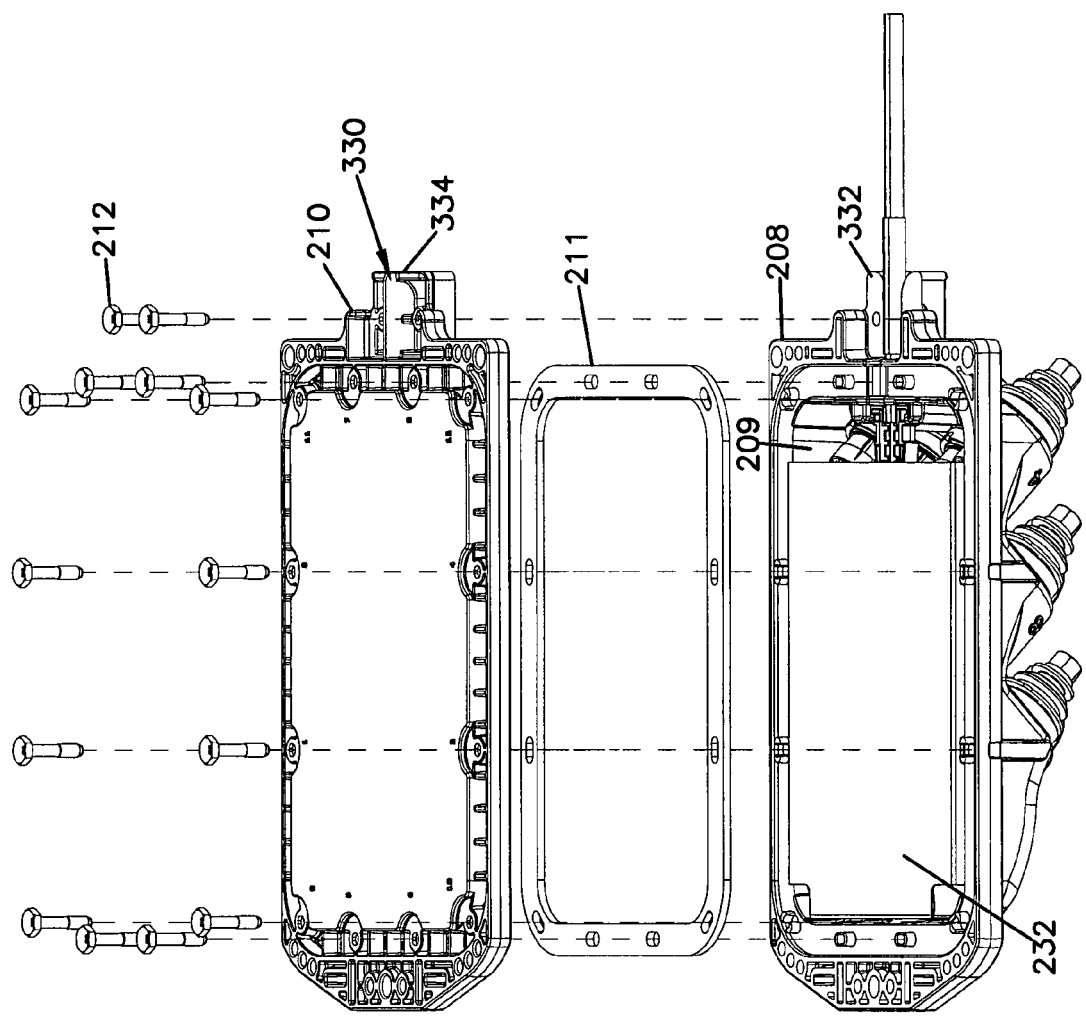
FIG. 5 is an exploded, rear view of the drop terminal of FIG. 2.
Figure 6:
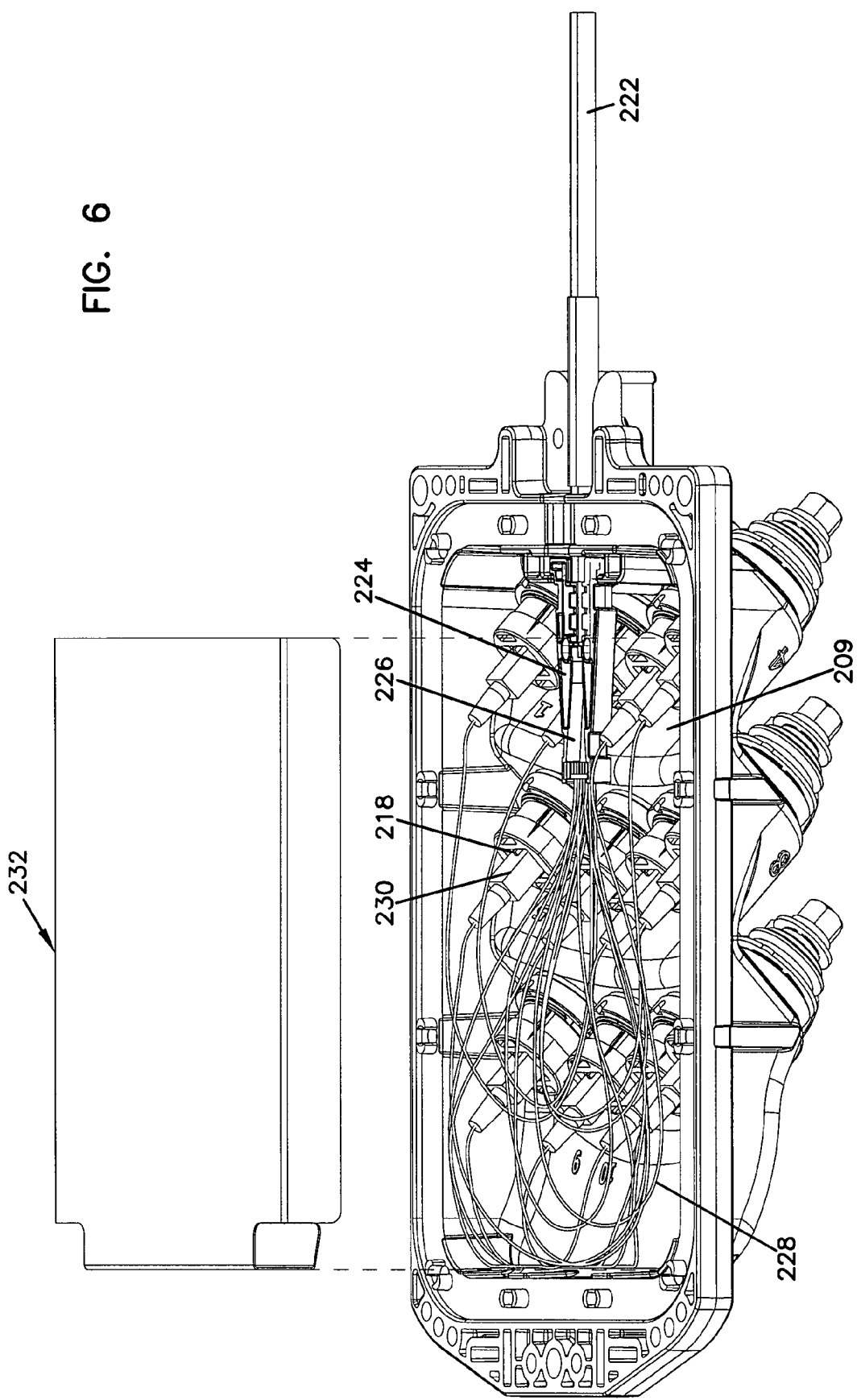
FIG. 6 is a rear, perspective view of the drop terminal of FIG. 2 with a rear piece of the drop terminal removed and a liner of the drop terminal exploded to show an interior of the drop terminal.

Referring to FIG. 6, the drop terminal 200 also includes an anchor block 224 for use in mechanically securing the fiber optic cable 222 to the main housing 202. The anchor block 224 includes a fan-out portion 226 that fans-out/spreads-apart optical fibers 228 of the fiber optic cable 222 that are routed and managed within the interior 209 of the main housing 202. An inner fiber optic connector 230 (see FIG. 6) is mounted at the end of each of the optical fibers 228. The inner fiber optic connectors 230 are inserted within the inner ports 218 of the fiber optic adapters 214. The drop terminal 200 also includes an inner liner 232 (i.e., a fiber protector or shield) (see FIGS. 5 and 6) that mounts within the main housing 202 and functions to hold or contain the optical fibers 228 within the interior of the front piece 208 during attachment of the back piece 210 to the front piece 208. The drop terminal 200 further includes a gasket 211 (see FIG. 5) mounted between the front and back pieces 208, 210 of the main housing 202. The gasket 211 extends around the perimeter or periphery of the main housing 202 and prevents moisture from entering the interior of the assembled main housing 202.

In use, the drop terminal 200 can be installed at a location such as one of the intermediate access locations 104 of the optical network 100 of FIG. 1. For such an application, the fiber optic cable 222 is a stub cable routed from a breakout location of a distribution cable, and the drop terminal 200 provides connection locations for connecting subscriber locations to the fiber optic network. For example, the drop terminal 200 can provide easily accessible locations for connecting drop cables to the fiber optic network. In one embodiment, first ends of the drop cables can be plugged into outer ports 216 of the fiber optic adapters 214, and second ends of the drop cables can be plugged into network interface devices at subscriber locations.

Figure 9:
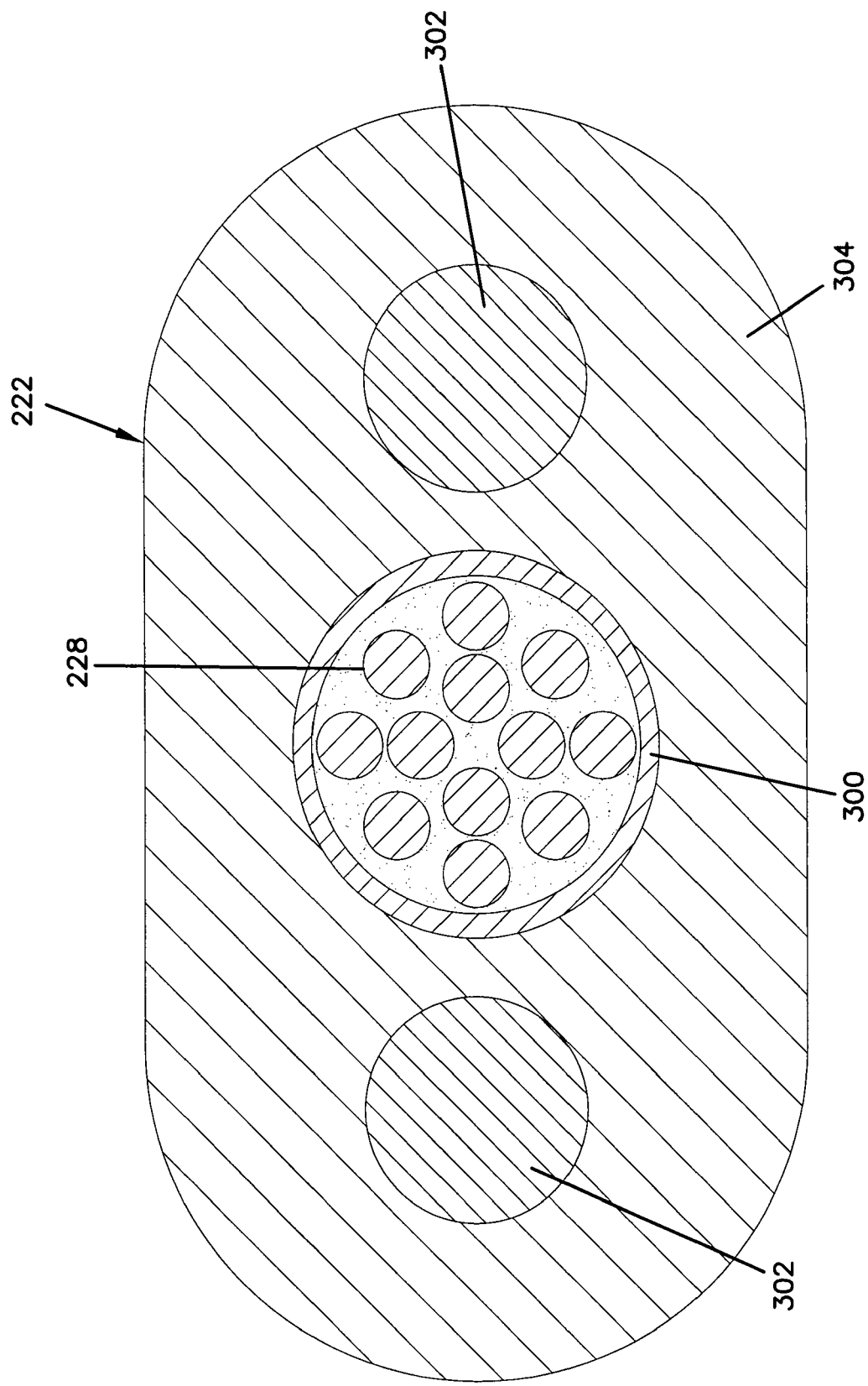
FIG. 9 is a cross-sectional view taken along section line 9-9 of FIG. 2.

The optical fibers 228 of the fiber optic cable 222 are adapted to carry/convey optical signals. The optical fibers 228 can each include a core surrounded by cladding. The core is the light-conducting central portion of the optical fiber 228. The cladding surrounds the core and is composed of a material having a lower index of refraction than the material of the core. Light is internally reflected within the core to transmit the optical signal along the core. As shown at FIG. 9, the optical fibers 228 are contained within a central buffer tube 300 of the fiber optic cable 222. The fiber optic cable 222 also includes strength members 302 (e.g., epoxy reinforced glass roving, aramid yarn, metal reinforcing members, or other reinforcing structure) positioned on opposite sides of the central buffer tube 300 for providing the cable with increased tensile strength. The strength members 302 and the central buffer tube 300 are positioned within an outer jacket 304 of the fiber optic cable 222.

Figure 2:
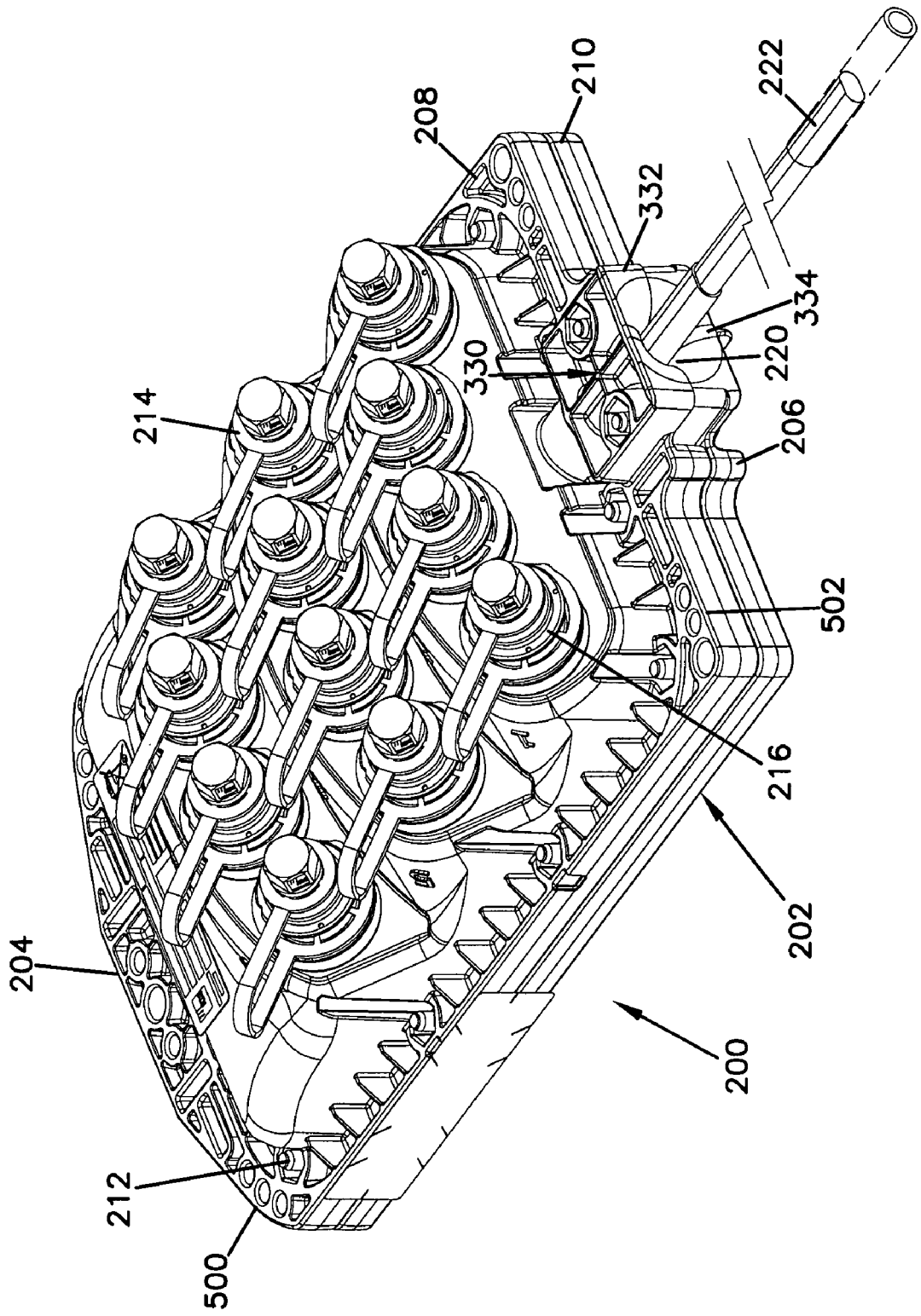
FIG. 2 is a perspective view of a drop terminal having features that are examples of inventive aspects in accordance with the principles of the present disclosure.
Figure 3:
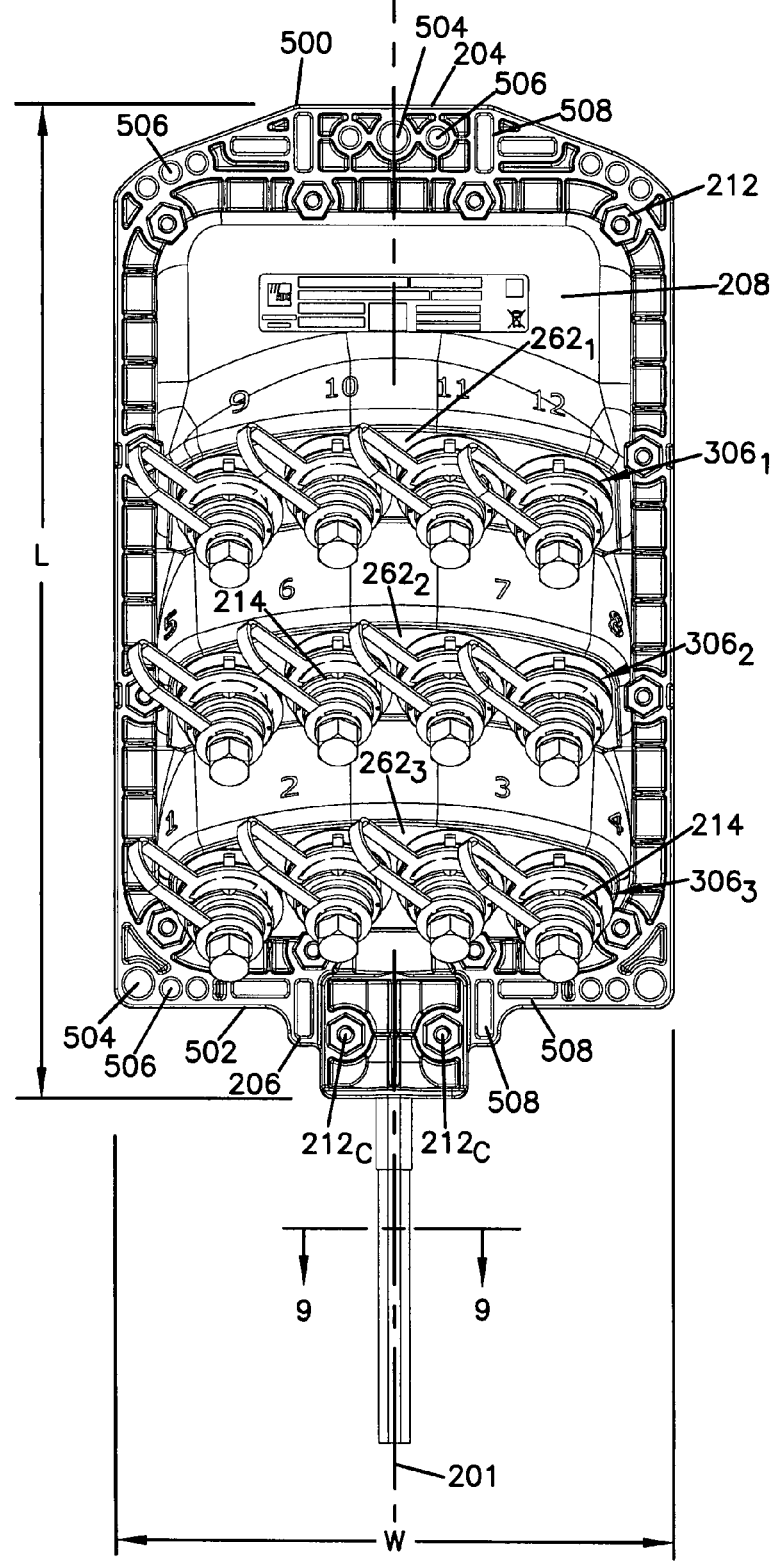
FIG. 3 is a front view of the drop terminal of FIG. 2.
Figure 4:
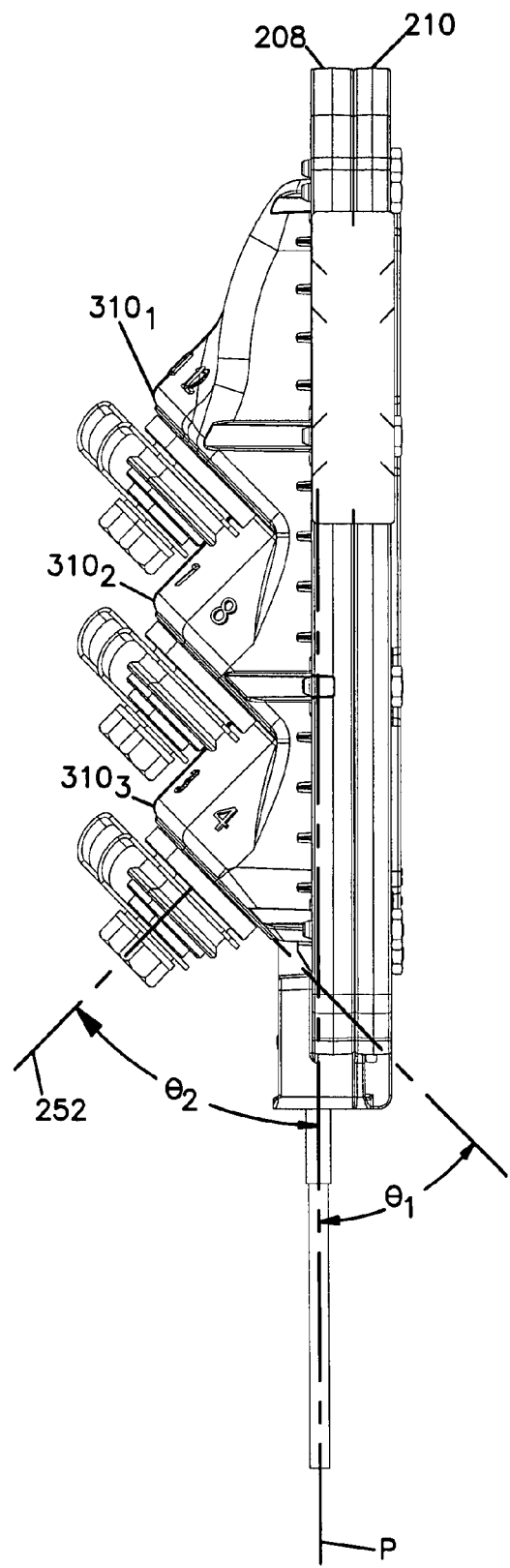
FIG. 4 is a side view of a drop terminal of FIG. 2.

Referring now to FIGS. 2-4, the main housing 202 of the drop terminal 200 includes a length L and a width W. The length L is parallel to the central longitudinal axis 201 of the main housing 202. First, second and third rows $306_1$-$306_3$ of fiber optic adapters 214 are mounted to the front piece 208 of the main housing 202. Each of rows $306_1$-$306_3$ includes four fiber optic adapters 214 spaced-apart across the width W of the main housing 202. The first row $306_1$ is located closest the first end 204 of the main housing 202, the third row $306_3$ is located closest the second end 206 of the main housing 202 and the second row $306_2$ is located between the first and third rows $306_1$, $306_3$. The front face of the front piece 208 has a stepped configuration with three steps $310_1$-$310_3$ positioned consecutively along the length L of the main housing 202. Each step $310_1$-$310_3$ includes an adapter mounting wall $262_1$-$262_3$ defining adapter mounting openings 258 (see FIG. 16) in which the fiber optic adapters 214 are mounted. As shown at FIG. 4, the adapter mounting walls $262_1$-$262_3$ are generally parallel to one another and are spaced apart along the length L of the main housing 202. The adapter mounting walls $262_1$-$262_3$ have front faces that are aligned at an oblique angle $\theta_1$ relative to a plane P that extends through the center axis of the fiber optic cable 222 and across the width W of the main housing 202. The angled configuration of the adapter mounting walls 262 causes the fiber optic adapters 214 to be angled relative to the plane P. For example, center axes 252 of the fiber optic adapters 214 are shown aligned at an oblique angle $\theta_2$ relative to the plane. In this way, the outer ports 216 of the fiber optic adapters 214 face generally in the same direction that the fiber optic cable 222 enters/exits the drop terminal 200.

The main housing 202 includes first and second end portions 500, 502 positioned outside the ring defined by the gasket 211. The first and second end portions 500, 502 include openings for use in receiving fastening structures for use in securing the drop terminal 200 to another structure (e.g., a wall, a pole, etc.). The openings include large fastener openings 504 for receiving large fasteners (e.g., lag bolts), smaller fastener openings 506 for receiving smaller fasteners (e.g., screws) and strap openings 508 for receiving fastening straps.

Figure 21:
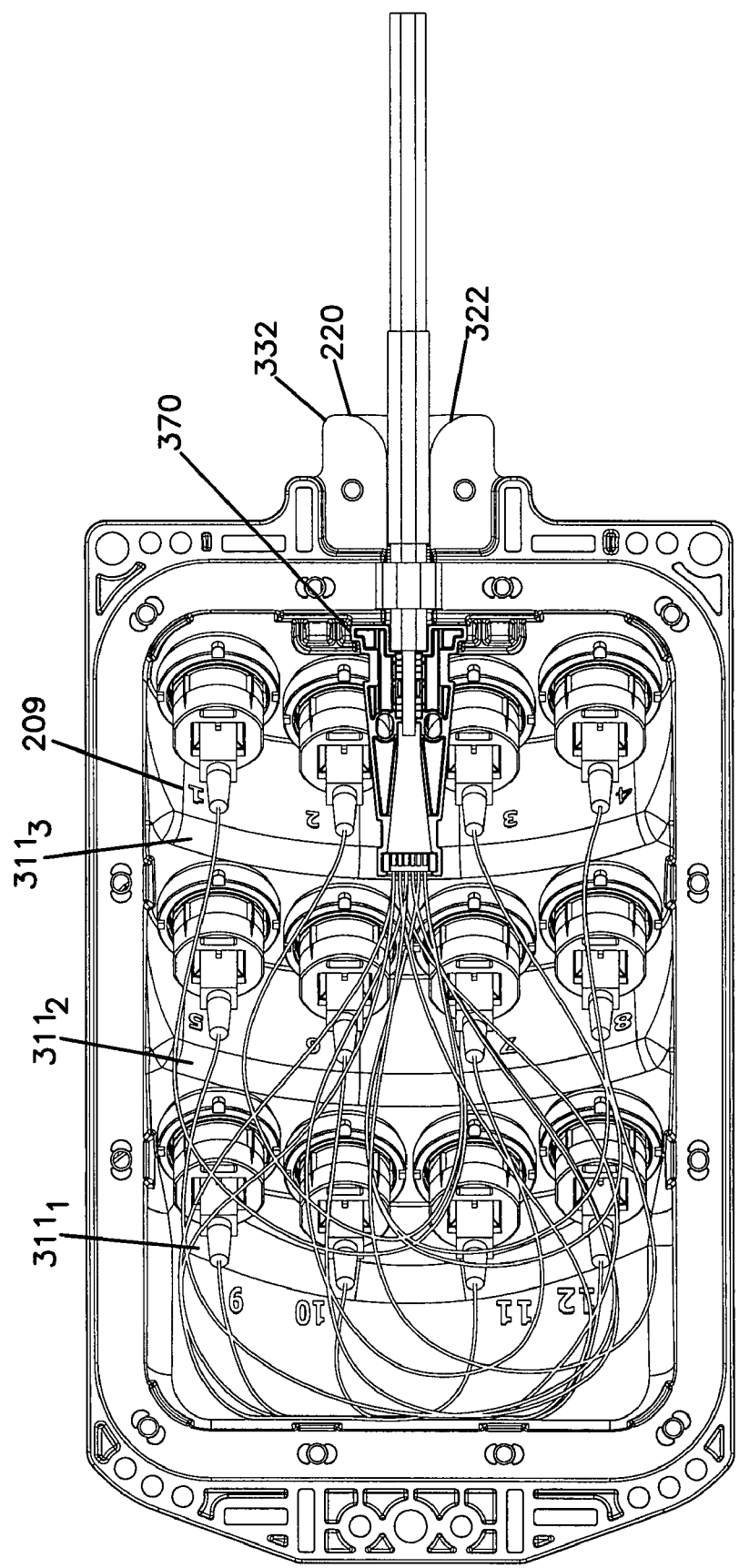

The cable port 220 of the drop terminal 200 is defined in part by the front piece 208 of the main housing 202 and in part by the back piece 210 of the main housing 202. As shown at FIG. 21, the cable port 220 has a curved end portion 322 that is configured to provide bend radius protection to the fiber optic cable 222. The curved end portion 322 flares/transitions radially outwardly from a center axis of the cable port 220 as the curved portion extends away from the interior of the main housing 202 to generally form a rounded bell-mouth at the outer end of the cable port 220.

Figure 17:
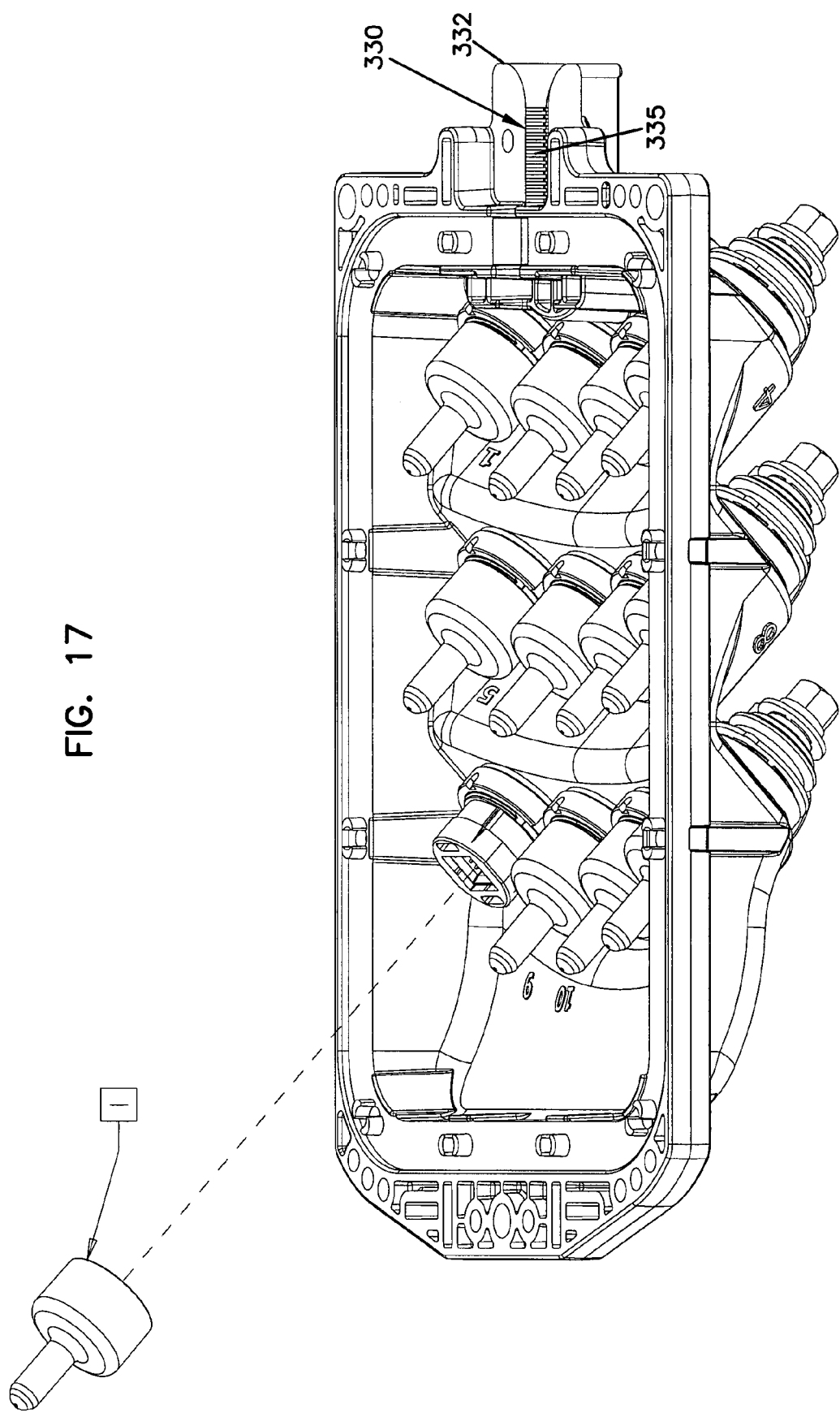
FIGS. 17-21 show a sequence of steps for securing an optical cable to the drop terminal of FIG. 2 and for routing fiber within the drop terminal of FIG. 2.
Figure 18:
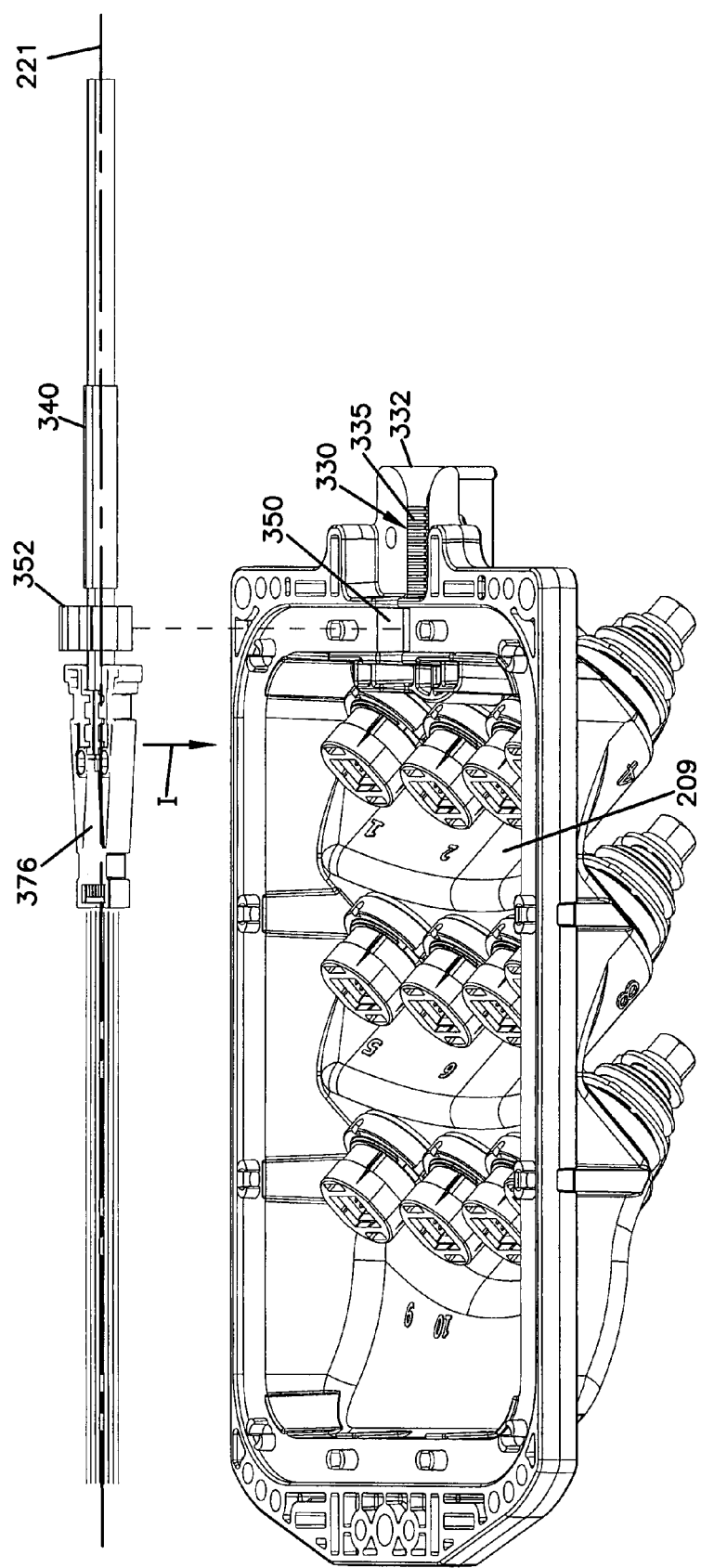
Figure 19:
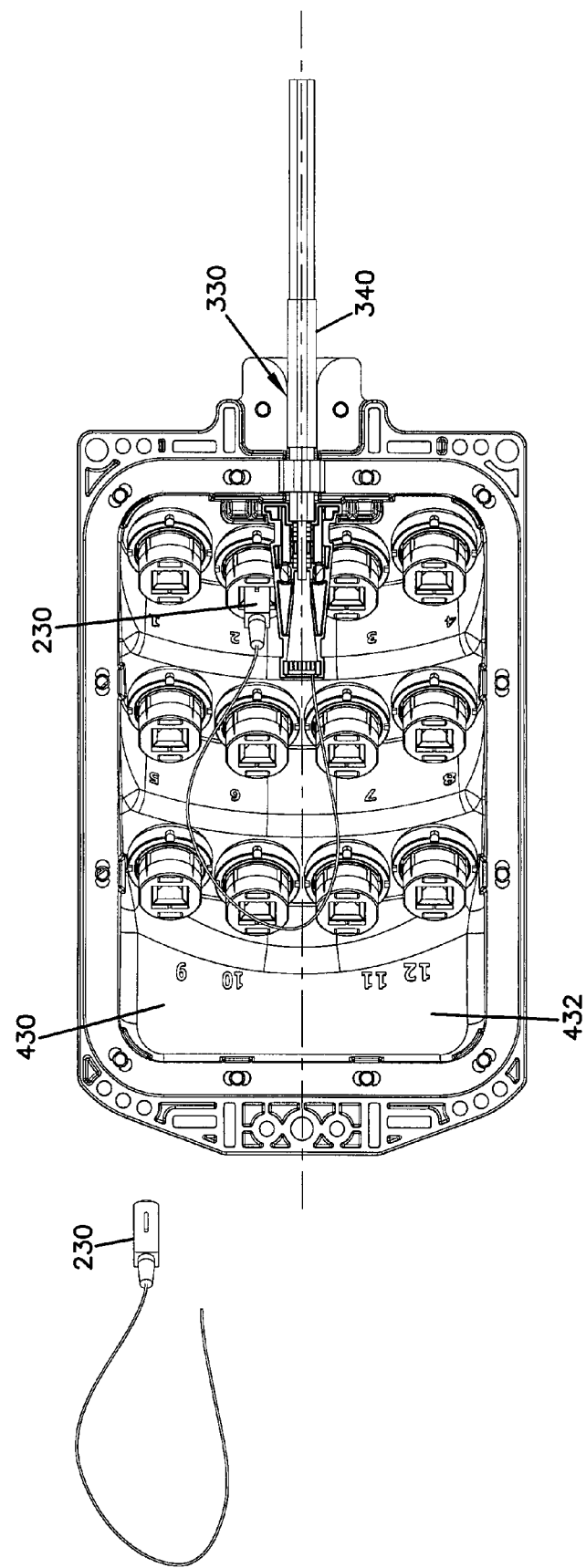

Referring to FIGS. 2, 5 and 17, a clamping portion 330 of the cable port 220 is defined between a front clamp member 332 and a back clamp member 334. The front clamp member 332 is integral with the front piece 208 of the main housing 202 and the back clamp member 334 is integral with the back piece 210 of the main housing 202. As shown at FIG. 17, the surface defining the clamping portion 330 of cable port 220 includes gripping structure 335 (e.g., structures such as ribs, projections, or knurling) to facilitate gripping the fiber optic cable 222 when the fiber optic cable 222 is clamped between the front and back clamp-members 332, 334. A resilient structure such as a shrink-fit tube 340 (see FIGS. 18 and 19) can be positioned about the fiber optic cable 222 within the clamping portion 330 to further provide enhanced gripping of the fiber optic cable 222.

The front and back clamp members 332, 334 can be drawn together to provide a clamping action through the use of fasteners $212_c$ (see FIG. 3). The fasteners $212_c$ are positioned on opposite sides of the clamping portion 330 of the cable port 220.

The cable port 220 further includes a pocket 350 (see FIG. 18) positioned between the clamping portion 330 and the interior 209 of the main housing 202. The pocket 350 is sized to receive a sealing member 352 (e.g., a resilient sealing member such as a rubber grommet) mounted on about the exterior of the fiber optic cable 222. When mounted in the pocket 350, the sealing member 352 underlies the gasket 211 that surrounds the perimeter of the main housing 202 of the drop terminal 200. When the front and back pieces 208, 210 of the main housing 202 are fastened together, the sealing member 352 is compressed within the pocket 350 to provide a seal between the outer jacket 304 of the fiber optic cable 222 and the main housing 202 of the drop terminal 200.

Figure 10:
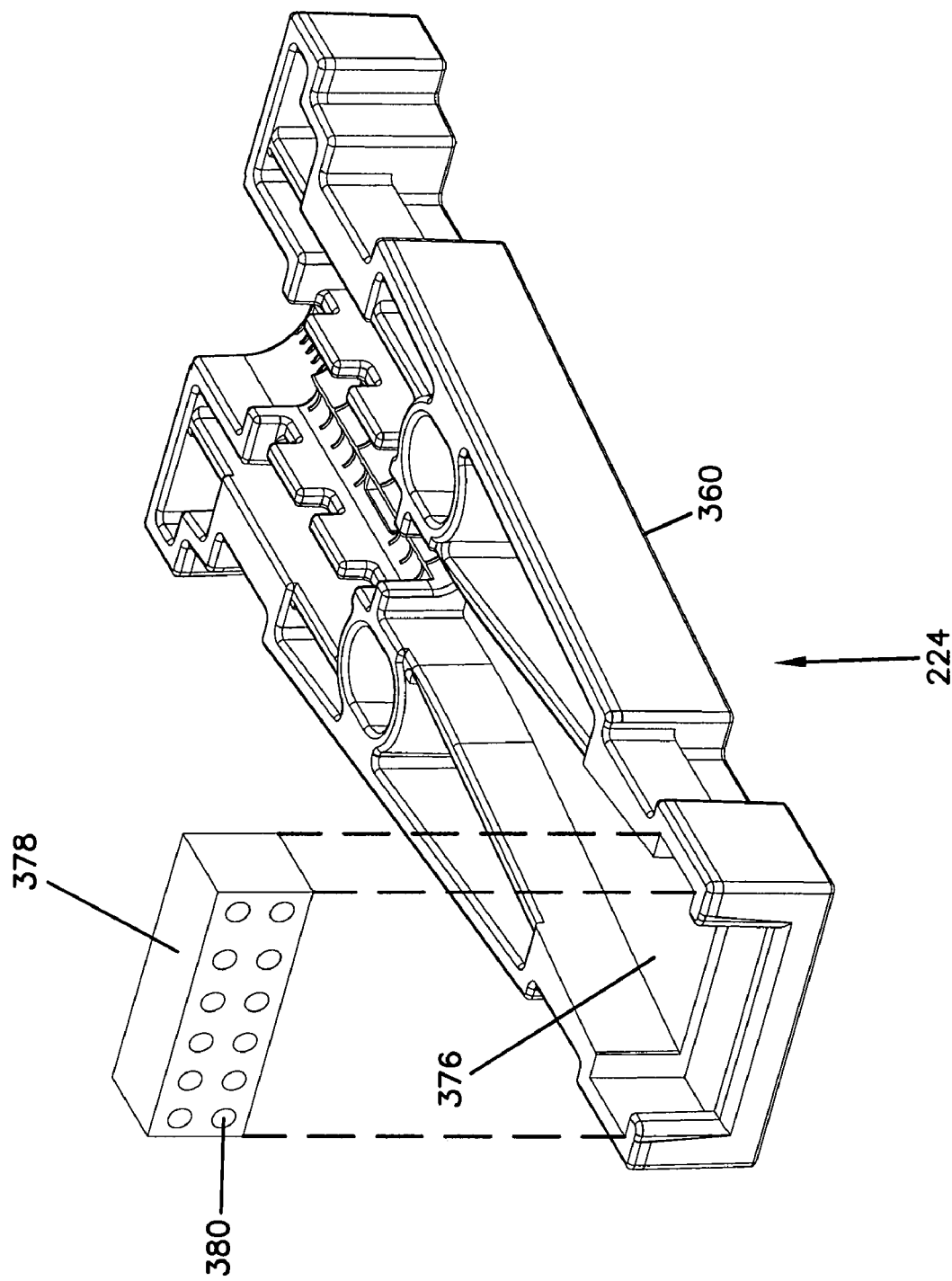
FIG. 10 is a top, perspective view of a cable anchor block incorporated within the drop terminal of FIG. 2.

The fiber optic cable 222 is further secured to the drop terminal 200 by a mechanical interlock. For example, the fiber optic cable 222 can be secured to the anchor block 224 (see FIGS. 6 and 18) that is then inserted into and interlocked with the main housing 202 so that axial movement of the fiber optic cable 222 relative to the main housing 202 is resisted. Referring to FIGS. 10-12, the anchor block 224 includes a main body 360 that extends from a first end 362 to a second end 364 of the anchor block 224. The main body 360 is elongated along a center axis 361 of the anchor block 224. The second end 364 of the anchor block 224 is configured to mechanically interlock with the main housing 202 of the drop terminal 200. For example, the second end 264 includes first and second interlock tabs 366, 368 that project outwardly from the main body 360 in opposite directions relative to the center axis 361. The first and second interlock tabs 366, 368 are configured to be received within a corresponding interlock receptacle 370 (see FIG. 21) provided within the interior of the front piece 208 adjacent the second end 206 of the main housing 202. The first and second interlock tabs 366, 368 are inserted into the interlock receptacle 370 by moving the anchor block 224 in an insertion direction I (see FIG. 18) that is transverse to a central axis 221 of the fiber optic cable 222. Thus, when the first and second interlock tabs 366, 368 are inserted into the interlock receptacle 370, interference between the first and second interlock tabs 366, 368 and the structure forming the interlock receptacle 370 resists movement of the anchor block 224 in a direction along the central axis 221 of the fiber optic cable 222. It will be appreciated that when the anchor block 224 is interlocked with the interlock receptacle 370, the center axis 361 of the anchor block 224 is coaxially aligned with the central axis 221 of the fiber optic cable 222.

Figure 7:
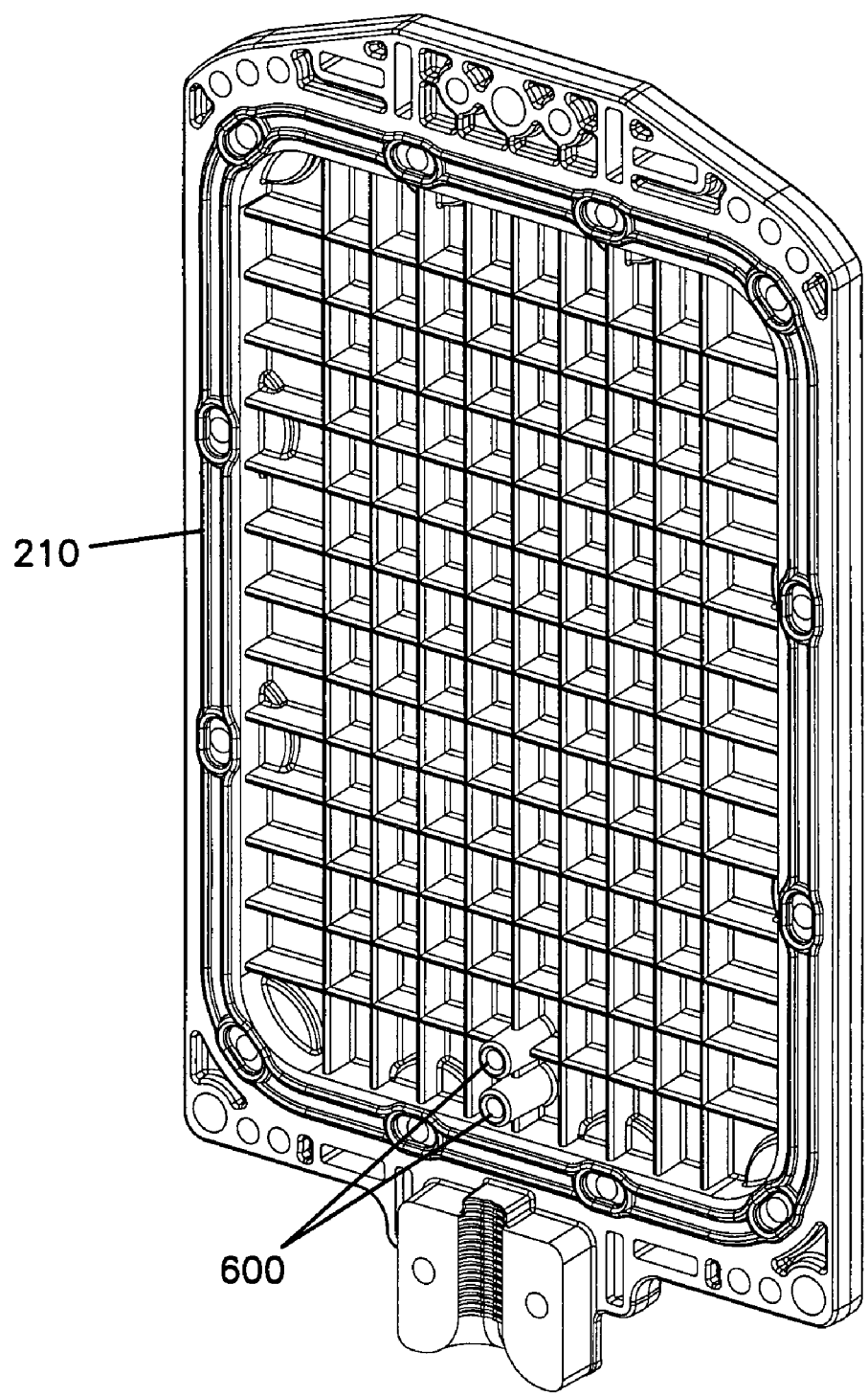
FIG. 7 is a perspective view of a front side of a back piece of a housing of the drop terminal of FIG. 2.
Figure 8:
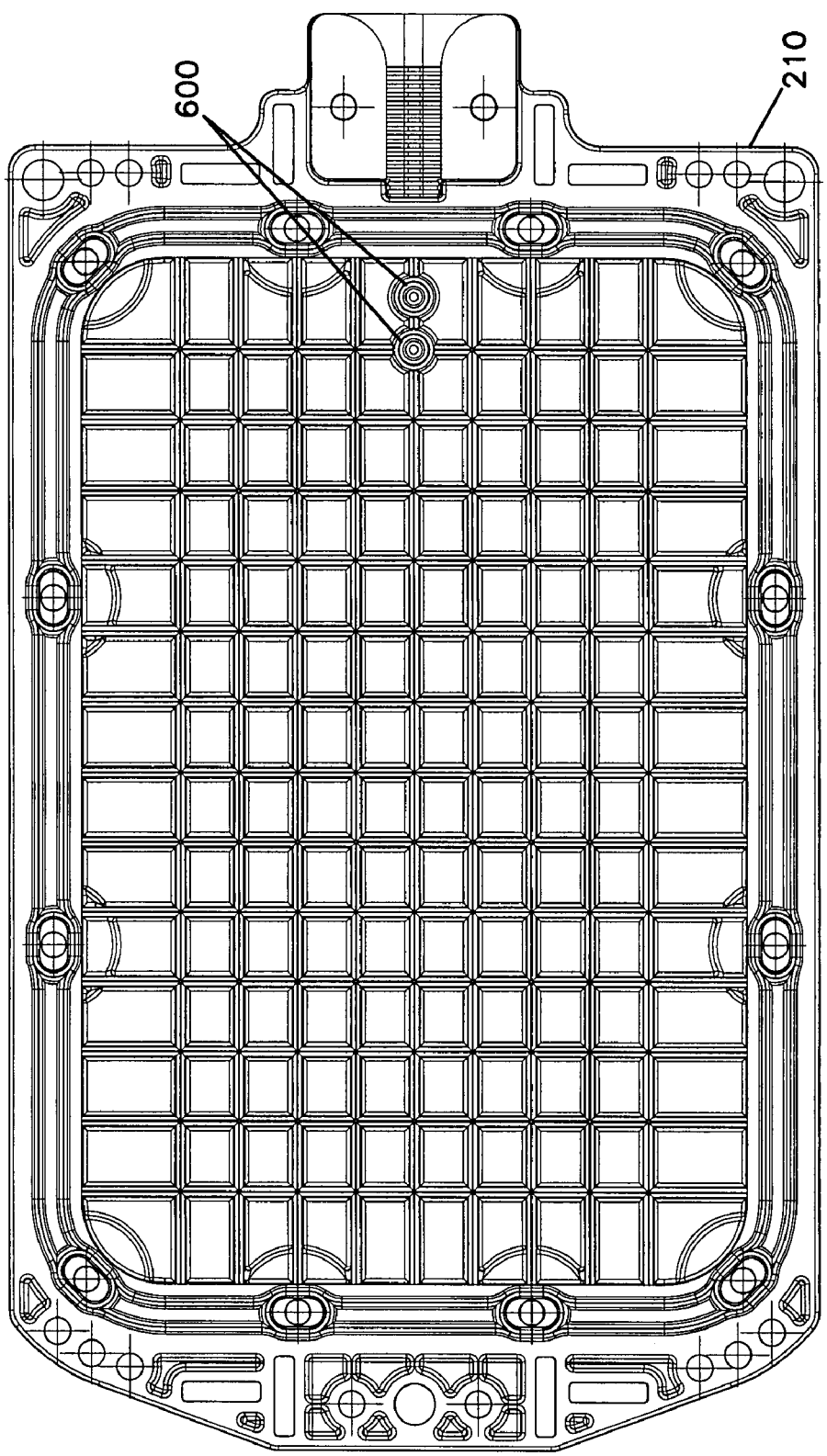
FIG. 8 is a plan view of the front side of the back piece of FIG. 7.

Referring to FIGS. 7 and 8, the front side of the back piece 210 of the main housing 202 includes a pair of forwardly projecting posts 600. When the drop terminal 200 is assembled, the posts 600 engage the main body 360 of the anchor block 224 to assist in retaining the first end 264 of the main body 360 within the interlock receptacle 370.

In the preferred embodiment the anchor block 224 is secured to the main housing 202 by a mechanical interlock. However, in alternative embodiments, alternate retention techniques (e.g., fasteners, adhesive, etc.) could also be used.

Referring to FIGS. 10-13, the anchor block 224 also includes structure for securing the fiber optic cable 222 to the main body 360 of the anchor block 224. For example, the second end 364 includes a central groove 372 for receiving the central buffer tube 300 of the fiber optic cable 222. The second end 364 also includes two side grooves 374 that are parallel to the central groove 372 and positioned on opposite sides of the central groove 372. The side grooves 374 are sized to receive the strength members 302 of the fiber optic cable 222. By placing the strength members 302 in the side grooves 374 and the central buffer tube 300 in the central groove 372, and then applying a securing material (e.g., an adhesive such as epoxy) to the grooves 372, 374, the fiber optic cable 222 is secured to the anchor block 224.

The anchor block 224 also includes the fan-out portion 226 for spreading/fanning-out the optical fibers 228 of the fiber optic cable 222. For example, as shown at FIGS. 10 and 11, the anchor block 224 includes a fan-out channel 376 that extends from the central groove 372 to the first end 362 of the main body 360 of the anchor block 224. The fan-out channel 376 has a width $W_1$ that gradually widens as the fan-out channel 376 extends along the center axis 361 from the central groove 372 to the first end 362 of the anchor block 224. A divider 378 (see FIG. 10) is located within the fan-out channel 376 at the first end 362 of the anchor block 224. The divider 378 includes a plurality of openings 380 that individually receive the optical fibers 228 to maintain separation of the optical fibers 228. In practice, the optical fibers 228 extend from the end of the central buffer tube 300 through the fan-out channel 376 to the divider 378. At the divider, the optical fibers 228 each extend through one of the openings of the divider 378. The tapered configuration of the fan-out channel 376 allows the optical fibers 228 to spread apart as the optical fibers 228 extend from the end of the central buffer tube 300 at the central groove 372 to the divider 378. A securing material (e.g., an adhesive such as epoxy) can be used to fill the fan-out channel 376 after the optical fibers 228 have been positioned therein to maintain position of the optical fibers 228.

Figure 14:
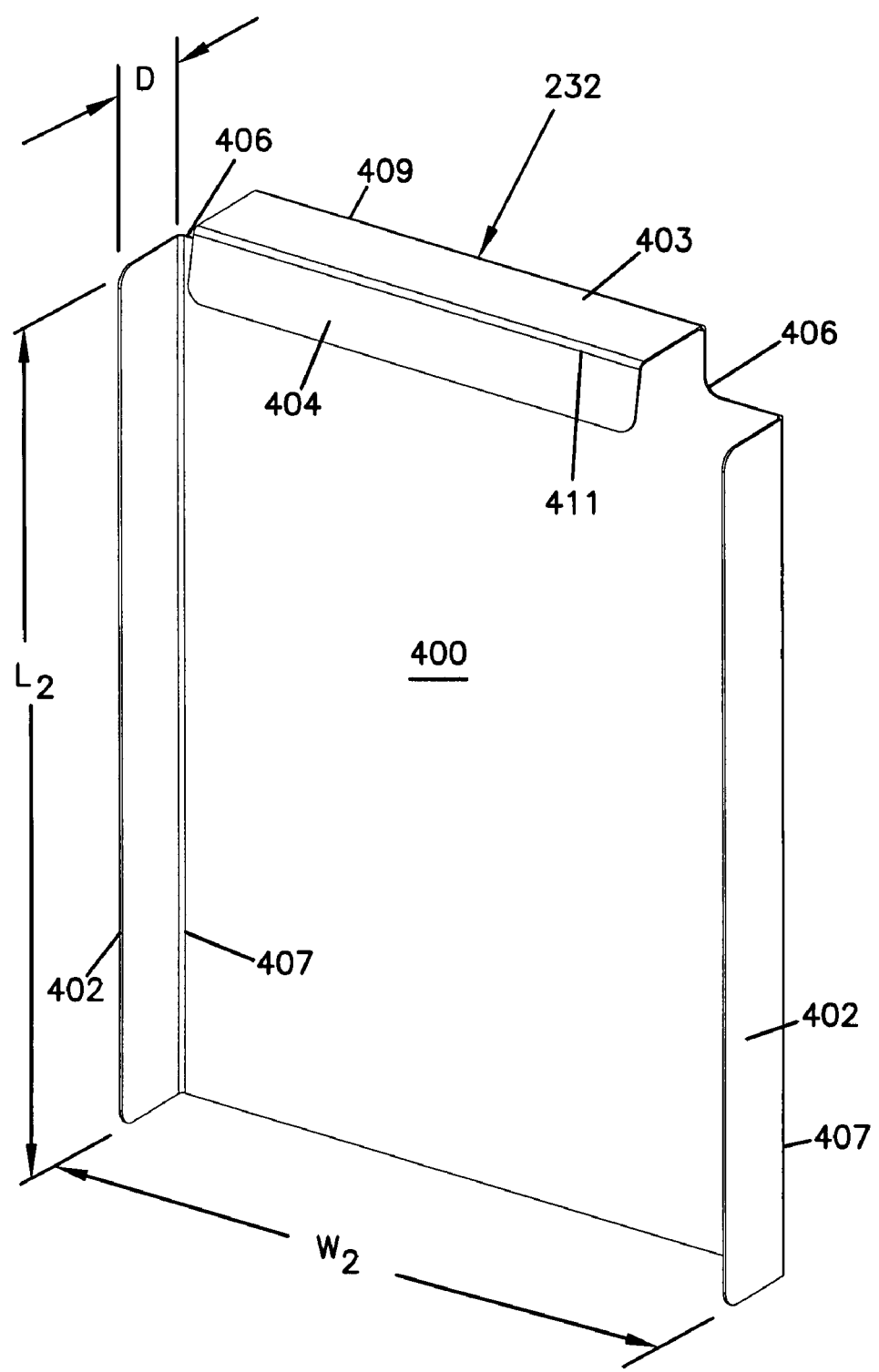
FIG. 14 is a perspective view of the fiber management liner of the drop terminal of FIG. 2.

Referring to FIGS. 5, 6 and 14, the inner liner 232 of the drop terminal 200 includes a generally rectangular main wall 400 having a width $W_2$ sized to extend generally across the width W of the main housing 202, and a length $L_2$ sized to extend along a majority of the length L of the main housing 202. The inner liner 232 also includes two opposing side walls 402 positioned at opposite sides of the width $W_2$ that project outwardly from the main wall 400 and extend along the length $L_2$ of the main wall 400. The inner liner 232 further includes an end wall 403 that projects outwardly from the main wall 400 at one end of the main wall 400, and a tab 404. The tab 404 is shown generally parallel to the main wall 400, while the side walls 402 and the end wall 403 are depicted as being generally perpendicular relative to the main wall 400. The inner liner 232 further includes corner notches 406 positioned on opposite sides of the end wall 403.

In one embodiment, the inner liner 232 is constructed of a sheet of transparent plastic material. In such an embodiment, the side walls connect to the main wall 400 at fold lines 407. Also, end wall 403 connects to the main wall 400 at fold line 409 and tab 404 connects to end wall 403 at fold line 411. Serrations can be provided at the fold lines to facilitate making the folds.

As shown in FIGS. 5 and 6, the main wall 400 of the inner liner 232 is configured to cover a majority of an open back side of the front piece 208 of the main housing 202. When positioned in the front piece 208, the main wall 400 covers the open back side of the front piece 208, and the side walls 402 project forwardly into the interior of the front piece 208. The side walls 402 can have a depth D sized such that the ends of the side walls rest on the back portions $311_1$-$311_3$ of the steps $310_1$-$310_3$ when the inner liner 232 is mounted within the front piece 208. Similarly, the end wall 403 is sized such that the tab 404 rests against the back side of the front wall of the front piece 208. When the inner liner 232 is positioned within the front piece 208, the inner liner 232 functions to retain the optical fibers 228 within the boundaries defined about the perimeter of the front piece 208. In this way, the optical fibers 228 are prevented from becoming pinched between the front piece 208 and the back piece 210 during assembly of the main housing 202. Because the inner liner 232 is transparent, the assembler can view the optical fibers 228 through the inner liner 232 to confirm that the optical fibers 228 are routed properly. The corner notches 406 provide clearance for accommodating the rounded inner corners defined within the interior of the front piece 208 adjacent the front end 204 of the main housing 202.

Figure 15:
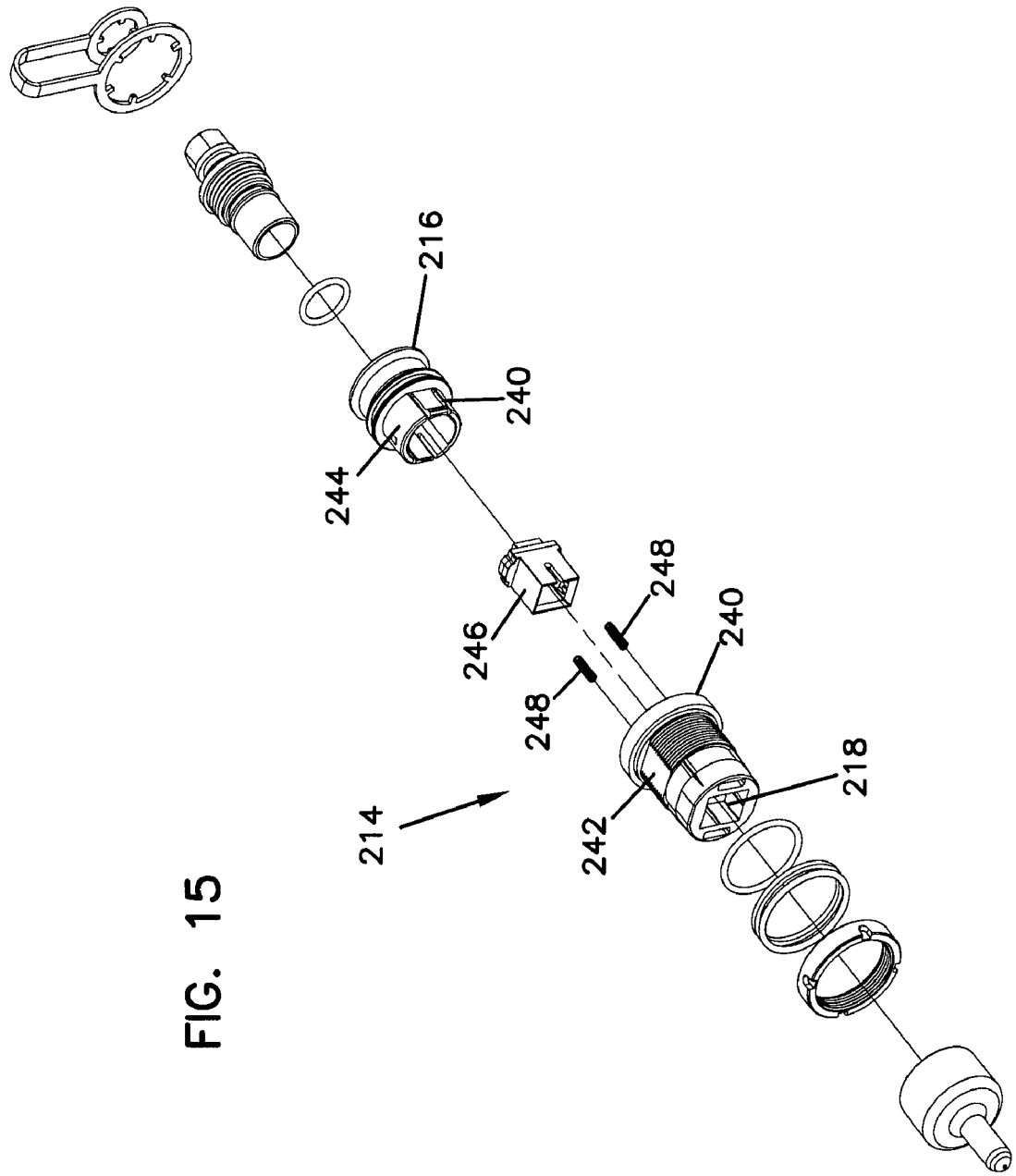
FIG. 15 is an exploded view of a fiber optic adapter of the drop terminal of FIG. 2.
Figure 16:
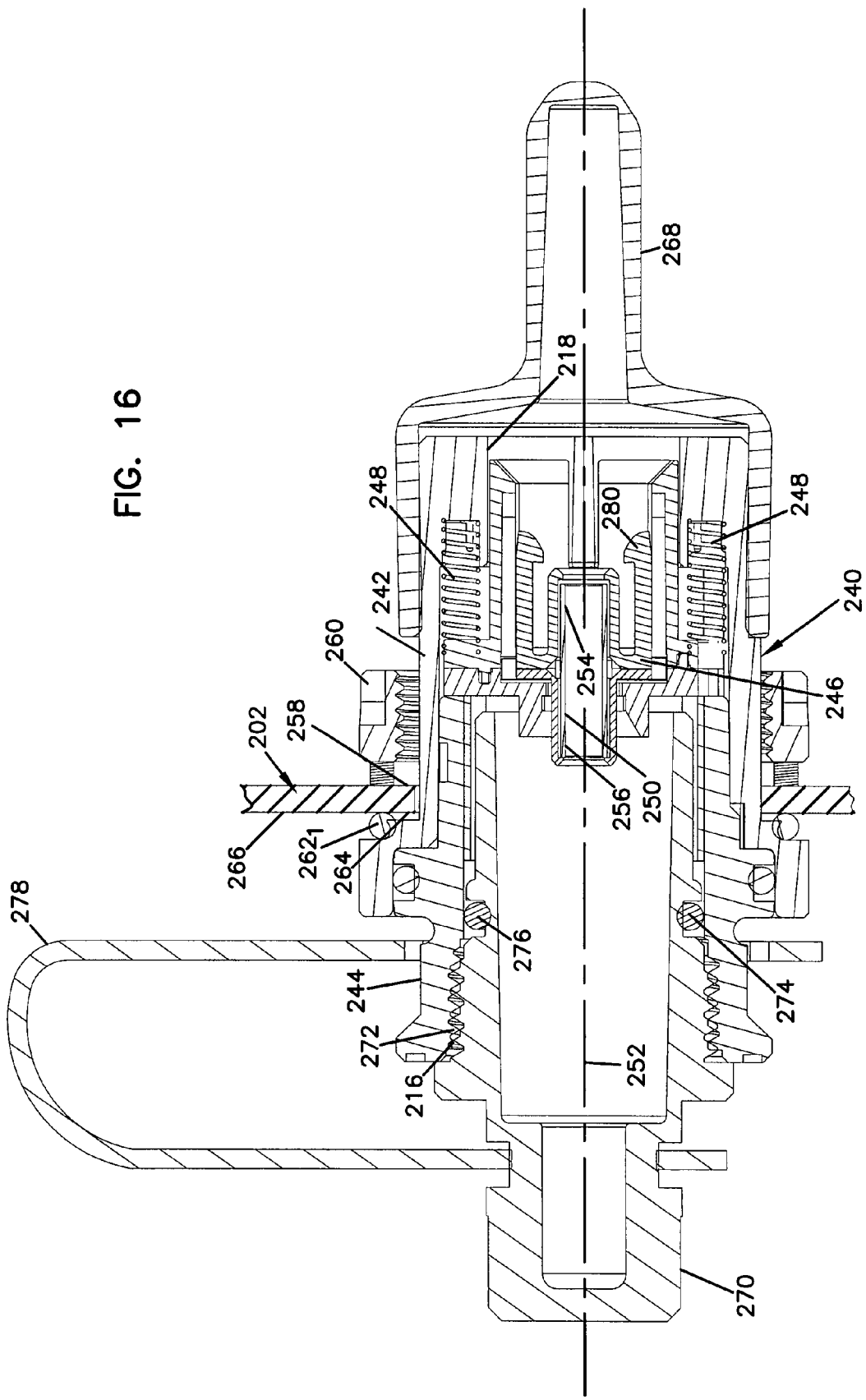
FIG. 16 is a cross-sectional view cut lengthwise through the fiber optic adapter of FIG. 15.

FIG. 15 illustrates one of the fiber optic adapters 214 in isolation from the main housing 202 of the drop terminal 200. The fiber optic adapter 214 includes a main housing 240 having a first piece 242 that defines the inner port 218 of the fiber optic adapter 214 and a second piece 244 that defines the outer port 216 of the fiber optic adapter 214. The first and second pieces 242, 244 can be interconnected by a snap-fit connection to form the main housing 240. A split sleeve housing 246 mounts within the interior of the main housing 240. Springs 248 bias the split sleeve housing 246 toward the outer port 216 and allow the split sleeve housing 246 to float within the interior of the main housing 240. As shown in FIG. 16, the split sleeve housing 246 houses a standard split sleeve 250 that is coaxially aligned with a center axis 252 of the fiber optic adapter 214. The split sleeve 250 includes a first end 254 that faces toward the inner port 218 of the fiber optic adapter 214 and a second end 256 that faces toward the outer port 216 of the fiber optic adapter 214. The fiber optic adapter 214 mounts within one of the adapter mounting openings 258 defined by the front piece 208 of the main housing 202. The fiber optic adapter 214 is retained within the adapter mounting opening 258 by a retention nut 260 threaded on exterior threads defined by the first piece 242 of the main housing 240. When the retention nut 260 is threaded into place, the corresponding adapter mounting wall $262_1$ of the front piece 208 is captured between the retention nut 260 and a shoulder 264 of the main housing 202. A sealing member 266 is compressed between the main housing 240 and the adapter mounting wall 262 to provide an environmental seal about the adapter mounting opening 258.

As shown in FIG. 16, a dust cap 268 is shown mounted covering the inner port 218 of the fiber optic adapter 214 and a plug 270 is shown mounted within the outer port 216 of the fiber optic adapter 214. The plug 270 is threaded within internal threads 272 defined within the outer port 216. The plug 270 also includes a sealing member 274 (e.g., an O-ring) that engages a sealing surface 276 within the outer port 216 to provide an environmental seal between the main housing 240 and the plug 270. A strap 278 secures the plug 270 to the main housing 240 to prevent the plug from being misplaced when removed from the outer port 216.

During assembly of the drop terminal 200, the fiber optic adapters 214 are mounted within the adapter mounting openings 258 defined through the front piece 208 of the main housing 202. After installation of the fiber optic adapters 214, the dust caps 268 can be removed to allow the inner fiber optic connectors 230 terminated to the optical fibers 228 to be inserted into the inner ports 218. When the inner fiber optic connectors 230 are inserted into the inner ports 218, ferrules of the inner fiber optic connectors 230 are received within the first ends 254 of the split sleeves 250, and clips 280 function to retain the inner fiber optic connectors 230 within the inner ports 218.

Figure 22:
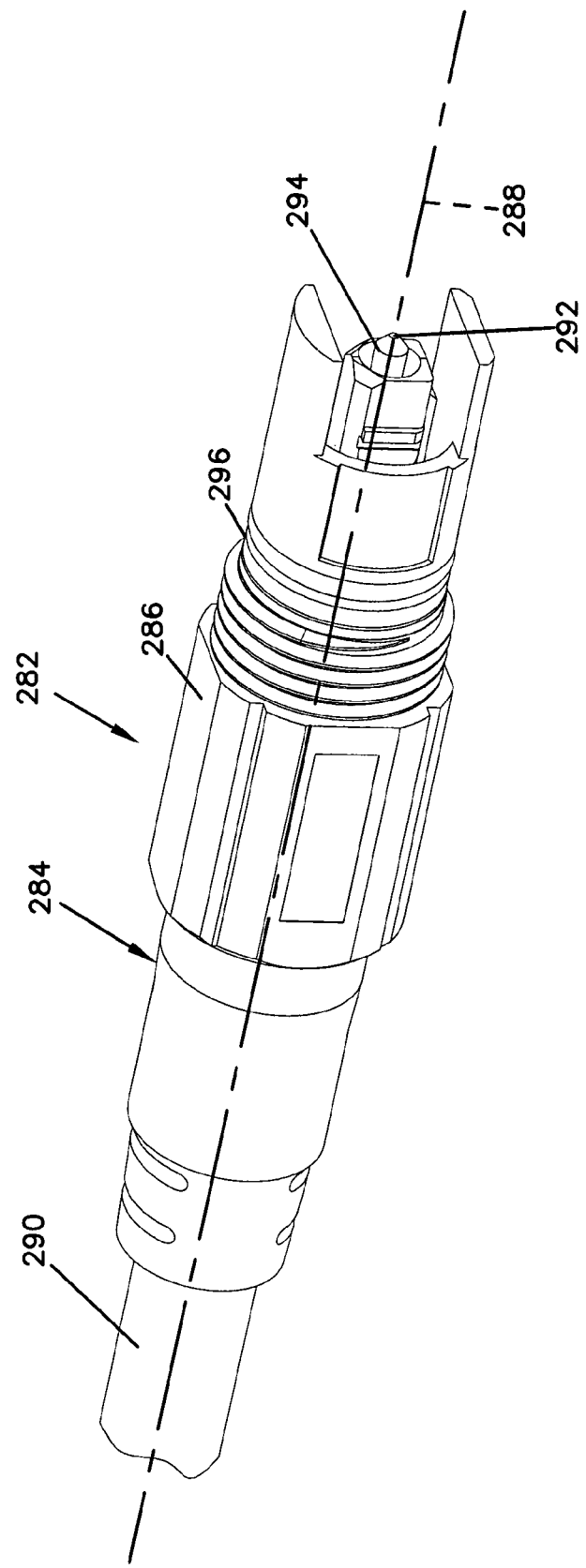
FIG. 22 shows a fiber optic connector mounted to a drop cable adapted to be interconnected with the drop terminal of FIG. 2.

When it is desired to optically couple a drop cable to the drop terminal 200, the plug 270 of one of the fiber optic adapters 214 is removed from its corresponding outer port 216 to allow an exterior fiber optic connector terminated to the drop cable to be inserted into the outer port 216. An example exterior fiber optic connector 282 mounted at the end of a drop cable 290 is shown at FIG. 22. The exterior fiber optic connector 282 includes a housing 284 on which a retention nut 286 is rotatably mounted. The retention nut 286 can be manually rotated about a central axis 288 of the exterior fiber optic connector 282. The drop cable 290 includes an optical fiber 292 having an end portion mounted within a ferrule 294 supported at one end of the housing 284. When the exterior fiber optic connector 282 is inserted within the outer port 216, the ferrule 294 is received within second end 256 of the split sleeve 250. In this way, the split sleeve 250 holds the ferrule of the inner fiber optic connector 230 in coaxial alignment with the ferrule 294 of the exterior fiber optic connector 282. By aligning the ferrules, the corresponding optical fibers 228, 292 held within the ferrules are placed in coaxial alignment thereby allowing light signals to be transferred from fiber to fiber. The exterior fiber optic connector 282 is retained within the outer port 216 by threading the retention nut 286 into the internal threads 272. Additionally, the exterior fiber optic connector 282 includes a sealing member 296 (e.g., an O-ring) that engages the sealing surface 276 to provide an environmental seal between the exterior fiber optic connector 282 and the fiber optic adapter 214. With the ends of the optical fibers 228, 292 aligned, fiber optic signals can readily be transmitted between the optical fibers 228, 292.

Figure 20:
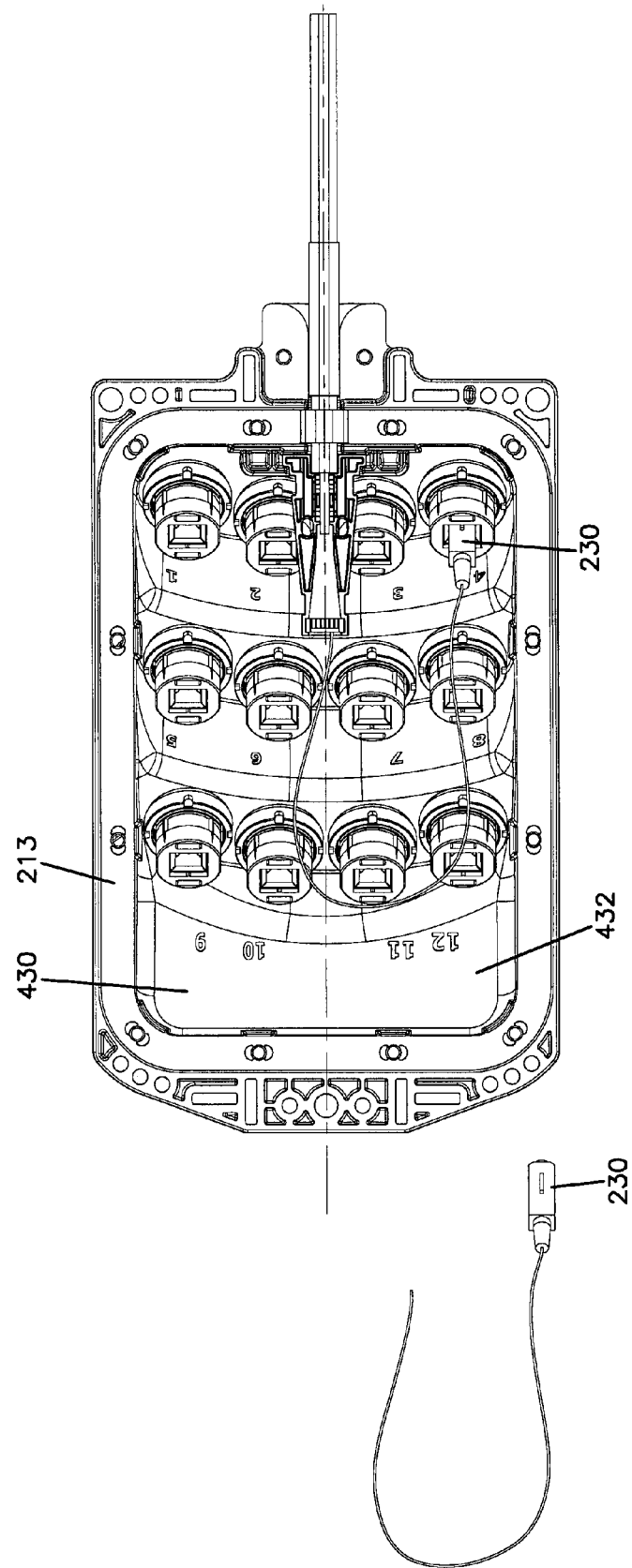

To assemble the drop terminal 200, the fiber optic adapters 214 are first mounted within the adapter mounting openings 258 defined by the front piece 208. The dust caps 268 are then removed from the fiber optic adapters 214 to provide access to the inner ports 218 (see FIG. 17). The fiber optic cable 222 is then prepared by stripping away an end portion of the outer jacket 304 and trimming back the central buffer tube 300 and strength members 302 to expose the optical fibers 228. The shrink-fit tube 340 and sealing member 352 are then mounted about the exterior of the outer jacket 304 of the fiber optic cable 222. Thereafter, the exposed central buffer tube 300 and strength members 302 are bonded to the anchor block 224 (e.g., with epoxy) and the exposed optical fibers 228 are routed through the fan-out channel 376 and inserted through the openings in the divider 378. Next, the inner fiber optic connectors 230 are mounted to the ends of the optical fibers 228. To secure the cable assembly to the main housing 202, the cable assembly is inserted downwardly through the open back side of the front piece 208 so that the shrink-fit tube 340 fits within the clamping portion 330 of the cable port 220, the sealing member 352 seats within the pocket 350 and the first and second interlock tabs 366, 368 fit within the interlock receptacle 370 of the front piece 208 (see FIG. 19). The optical fibers 228 are then routed in a looped fashion within the interior of the front piece 208 and the inner fiber optic connectors 230 are inserted into the inner ports 218 of the fiber optic adapters 214. Fibers routed to a first side 430 of the front piece 208 are looped in a clockwise route while fibers routed to a second side 432 of the front piece 208 are routed in a counterclockwise loop route (see FIGS. 19 and 20). Thereafter, the inner liner 232 is inserted into the back side of the front piece 208 to contain the optical fibers within the interior of the front piece 208 (see FIGS. 5 and 6). The gasket 211 is then inserted into a recess or groove 213 provided about a perimeter of the front piece 208. The back piece 210 is then mounted to the front piece 208 by fasteners 212. Tightening of the fasteners causes compression of the gasket 211 which provides an outer seal that surrounds the interior 209 of the main housing 202. Tightening of the fasteners also compresses the sealing member 352 to seal the cable port 220 and causes compression of the shrink-fit tube 340 between the front and back clamp members 332, 334 to provide further retention of the fiber optic cable 222.

In a preferred embodiment, the main housing 202 and the anchor block 224 have a molded plastic construction. However, other materials could also be used.

From the forgoing detailed description, it will be evident that modifications and variations can be made in the devices of the disclosure without departing from the spirit or scope of the invention.

What is claimed is:

1. A drop terminal comprising:
   a main housing enclosing an interior of the main housing, the main housing defining a cable port;
   a plurality of fiber optic adapters mounted to the main housing, the fiber optic adapters including inner ports that are accessible from within the interior of the main housing and outer ports that are accessible from outside the main housing;
   a fiber optic cable that enters/exits the interior of the main housing through the cable port, the fiber optic cable including a plurality of optical fibers and at least one strength member;
   a plurality of fiber optic connectors mounted to ends of the optical fibers, the fiber optic connectors being located within the interior of the main housing and being inserted within the inner ports of the fiber optic adapters; and
   an anchor block to which the at least one strength member of the fiber optic cable is secured, the anchor block being positioned within the interior of the main housing, the anchor block mechanically interlocking with the main housing to secure the fiber optic cable to the main housing, wherein the anchor block includes a main body having a first region to which the strength member of the fiber optic cable is secured, and a second region for fanning out the optical fibers of the fiber optic cable.

2. The drop terminal of claim 1, wherein the second region includes a channel that extends away from the first region, the channel being configured to increase in width as the channel extends away from the first region.

3. The drop terminal of claim 2, further comprising a divider positioned within the channel adjacent a wide end of the channel, the divider including a plurality of openings for separating the optical fibers.

4. The drop terminal of claim 1, wherein the anchor block includes interlock tabs that fit within a receptacle defined by the main housing.

5. A drop terminal comprising:
a main housing enclosing an interior of the main housing, the main housing defining a cable port;
a plurality of fiber optic adapters mounted to the main housing, the fiber optic adapters including inner ports that are accessible from within the interior of the main housing and outer ports that are accessible from outside the main housing;
a fiber optic cable that enters/exits the interior of the main housing through the cable port, the fiber optic cable including a plurality of optical fibers and at least one strength member;
a plurality of fiber optic connectors mounted to ends of the optical fibers, the fiber optic connectors being located within the interior of the main housing and being inserted within the inner ports of the fiber optic adapters; and
an anchor block to which the at least one strength member of the fiber optic cable is secured, the anchor block being positioned within the interior of the main housing, the anchor block mechanically interlocking with the main housing within the interior to secure the fiber optic cable to the main housing, wherein the anchor block includes a main body having a central axis that extends from a first end to a second end of the main body, the anchor block including interlock tabs that project outwardly from the main body in opposite directions from the central axis of the main body, the interlock tabs being located adjacent the second end of the main body and being configured to interlock with the main housing, wherein the fiber optic cable is secured to the anchor block adjacent the second end of the main body, and wherein the anchor block defines a fan-out channel that extends along the central axis of the main body for receiving and fanning out the optical fibers of the fiber optic cable.

6. The drop terminal of claim 5, wherein the central axis of the main body aligns with a central axis of the fiber optic cable.

7. The drop terminal of claim 6, wherein the fiber optic cable includes a buffer tube containing the optical fibers and also includes strength members positioned on opposite sides of the buffer tube, wherein the anchor block defines a central channel located adjacent the second end of the main body for receiving the buffer tube of the fiber optic cable, the central channel extending along the central axis of the main body, wherein the anchor block defines side channels positioned on opposite sides of the central channel for receiving the strength members of the fiber optic cable, and wherein the buffer tube is bonded within the central channel and the strength members are bonded with the side channels.

8. The drop terminal of claim 7, wherein the fan-out channel extends from the central channel to the first end of the main body, wherein the fan-out channel widens as the fan-out channel extends toward the first end of the main body, and wherein a fiber divider is mounted within the fan-out channel adjacent the second end of the main body.

9. The drop terminal of claim 5, wherein the cable port has an outer portion that is curved to provide bend radius protection to the fiber optic cable.

10. The drop terminal of claim 5, wherein the main housing includes clamping portions that clamp the fiber optic cable within the cable port.

11. A drop terminal comprising:
a main housing including a first piece and a second piece that cooperate to enclose an interior of the main housing, the main housing defining a cable port between the first and second pieces, the main housing including clamping portions disposed adjacent to the cable port, the main housing also defining an anchor block receptacle within the interior of the main housing adjacent to the cable port;
a plurality of fiber optic adapters mounted to the main housing, the fiber optic adapters including inner ports that are accessible from within the interior of the main housing and outer ports that are accessible from outside the main housing;
a fiber optic cable that enters/exits the interior of the main housing through the cable port, the fiber optic cable including a central buffer tube containing a plurality of optic fibers, the fiber optic cable also including strength members positioned on opposite sides of the central buffer tube;
a plurality of fiber optic connectors mounted to ends of the optic fibers, the fiber optic connectors being located within the interior of the main housing and being inserted within the inner ports of the fiber optic adapters; and
an anchor block to which the strength members of the fiber optic cable are secured, the anchor block being positioned within the interior of the main housing, the anchor block including an interlock portion that fits within the anchor block receptacle of the main housing to mechanically interlock the anchor block with the main housing, wherein the anchor block includes a main body having a first region to which the strength members of the fiber optic cable are secured, and a second region for fanning out the optic fibers of the fiber optic cable.

12. The drop terminal of claim 11, wherein the second region includes a channel that extends away from the first region, the channel being configured to increase in width as the channel extends away from the first region.

13. The drop terminal of claim 12, further comprising a divider positioned within the channel adjacent a wide end of the channel, the divider including a plurality of openings for separating the optical fibers.

* * * * *